US012090102B2

(12) United States Patent
Hetzel et al.

(10) Patent No.: US 12,090,102 B2
(45) Date of Patent: Sep. 17, 2024

(54) WHEELCHAIR BACK SUPPORT ADJUSTMENT SYSTEM WITH CENTRAL SPHERICAL JOINT

(71) Applicant: Sunrise Medical (US) LLC, Fresno, CA (US)

(72) Inventors: Thomas R. Hetzel, Littleton, CO (US); Joseph S. Bieganek, Littleton, CO (US); Eric Vielbig, Golden, CO (US); Karl L. Youngdahl, Denver, CO (US); Joshua A. Middel, Littleton, CO (US)

(73) Assignee: Sunrise Medical (US) LLC, Fresno, CA (US)

( * ) Notice: Subject to any disclaimer, the term of this patent is extended or adjusted under 35 U.S.C. 154(b) by 696 days.

(21) Appl. No.: 17/215,458

(22) Filed: Mar. 29, 2021

(65) Prior Publication Data

US 2021/0307980 A1 Oct. 7, 2021

Related U.S. Application Data

(60) Provisional application No. 63/004,936, filed on Apr. 3, 2020.

(51) Int. Cl.
*A61G 5/10* (2006.01)

(52) U.S. Cl.
CPC .................................. *A61G 5/1067* (2013.01)

(58) Field of Classification Search
CPC .................................................... A61G 5/1067
See application file for complete search history.

(56) References Cited

U.S. PATENT DOCUMENTS 4,925,242 A * 5/1990 Harris .................. A61G 5/1054 297/284.4
5,364,162 A * 11/1994 Bar .......................... A61G 5/10 297/284.7
7,980,580 B2 * 7/2011 Loewenthal ......... A61G 5/1054 248/230.1
8,376,463 B2 * 2/2013 Cooper ................ A61G 5/1067 297/354.11
8,517,469 B1 8/2013 Hetzel et al.
8,567,863 B2 * 10/2013 Hetzel .................. A61G 5/1067 297/354.11
8,590,977 B2 * 11/2013 Bee ......................... F16B 2/065 297/440.2

(Continued)

*Primary Examiner* — Tony H Winner
(74) *Attorney, Agent, or Firm* — MacMillan, Sobanski & Todd, LLC

(57) ABSTRACT

A wheelchair back support adjustment assembly that utilizes a swivel assembly is disclosed. This swivel assembly provides an entirety of an interconnection between the wheelchair back support adjustment assembly and a back support of a wheelchair. The wheelchair back support adjustment assembly may also include a linkage that interfaces with the swivel assembly. Opposite end portions of the linkage are connectable with a corresponding cane of a wheelchair. The configuration of the wheelchair back support adjustment assembly accommodates a variety of adjustments, to correspondingly adjust a back support of a wheelchair when in an installed configuration (e.g., to customize the back support to a user of the wheelchair). These adjustments may be through one or more adjustments of the swivel assembly, one or more adjustments adjustment of the linkage, or both.

30 Claims, 32 Drawing Sheets

(56) References Cited

U.S. PATENT DOCUMENTS

| | | | | |
|---|---|---|---|---|
| 10,182,953 | B2 * | 1/2019 | Tsuber | A61G 5/1067 |
| 2008/0157581 | A1 * | 7/2008 | Whelan | A61G 5/1067<br>297/440.2 |
| 2016/0262965 | A1 * | 9/2016 | Goeckel | A61G 5/1067 |

* cited by examiner

WHEELCHAIR BACK SUPPORT ADJUSTMENT SYSTEM WITH CENTRAL SPHERICAL JOINT

CROSS-REFERENCE TO RELATED APPLICATIONS

This patent application is a non-provisional patent application of, and claims the benefit of, U.S. Provisional Patent Application No. 63/004,936, that is entitled "WHEELCHAIR BACK SUPPORT ADJUSTMENT SYSTEM WITH CENTRAL SPHERICAL JOINT," that was filed on 3 Apr. 2020, and the entire disclosure of which is hereby incorporated by reference herein.

FIELD

The present disclosure generally relates to the field of wheelchairs and, more particularly, to providing the ability to adjust an orientation of a back support of a wheelchair.

BACKGROUND

A prior art three-axis adjustable back support assembly 30 is shown generally in FIGS. 1-3. The back support assembly 30 is attached between upright posts or canes 32 on opposite transverse sides of a tubular frame 34 of a conventional wheelchair 36. The back support assembly 30 connects to and supports a back shell 38 to which a back cushion 40 is attached. The back shell 38 and the back cushion 40 are positioned relative to a seat cushion 42 which is supported on a platform 44 of the wheelchair frame 34. The position of the back shell 38 and back cushion 40 relative to the seat cushion 42 supports and locates the back and upper torso of a wheelchair user 46 seated on the wheelchair 36, to enable the user 46 to assume a proper and safe posture, while resting against the back cushion 40 and the seat cushion 42. Proper and safe posture on the wheelchair 36 is particularly important to a wheelchair user who has physical disabilities and associated posture and postural control impairments, such as those typically caused by congenital disorders, as well as wheelchair users who have a more typical size and shape but have been disabled by acquired or traumatic injuries or disease.

The three-axis back support assembly 30 positions and adjusts the back shell 38 and the back cushion 40 in a forward and backward manner along a horizontal longitudinal axis 48 (FIG. 2), as well as pivots the shell 38 and cushion 40 about that axis 48. The back support assembly 30 also adjusts the shell 38 and cushion 40 in a side-to-side manner along a horizontal transverse axis 50, and pivots the shell 38 and cushion 40 about that axis 50. The shell 38 and cushion 40 are also adjustable upward and downward along a vertical axis 52, and is also adjustable to pivot about that vertical axis 52, by the back support assembly 30.

The conventional wheelchair 36 with which the back support assembly 30 is used typically has two drive wheels 54 which are attached on opposite sides of the wheelchair frame 34 by which the user 46 can maneuver the wheelchair 36. Foot rests 56 extend downward from the frame 34 below the forward edge of the seat cushion 42 to support the feet of the user 46. Casters 58 extend from the wheelchair frame 34 in front of the drive wheels 54 to provide the stability of a four-wheeled vehicle. Although not specifically shown, many conventional wheelchair frames 34 are collapsible in a transverse direction, to facilitate storage and transportation. The back support assembly 30 is disconnectable from the canes 32 of the wheelchair frame 34 to separate the back shell 38 and back cushion 40 from the frame 34, thereby allowing the wheelchair 36 to be collapsed.

SUMMARY

A wheelchair back support adjustment assembly is presented herein. Both the configuration of such an wheelchair back support adjustment assembly and the operational characteristics/operation/assembly/manufacture of such an wheelchair back support adjustment assembly are within the scope of this Summary. The noted wheelchair back support adjustment assembly utilizes a swivel assembly that provides an entirety of an interconnection between the wheelchair back support adjustment assembly and a back support of a wheelchair. As such, changing the position and/or orientation of at least part of the swivel assembly provides a corresponding adjustment of the back support of the wheelchair when the wheelchair back support adjustment assembly is in an installed configuration relative to the wheelchair.

The entirety of the swivel assembly may be adjustable in multiple dimensions. For instance, the entirety of the swivel assembly may be adjustable in a vertical dimension (e.g., to accommodate for the height of a user of the wheelchair), may be adjustable in a lateral dimension (e.g., orthogonal to the vertical dimension; "lateral" corresponding with a width of a wheelchair that includes the wheelchair back support adjustment assembly), or both. The swivel assembly may be characterized as having a swivel housing that is disposed about a swivel, with the swivel housing being interconnected with the back support of the wheelchair when the wheelchair back support adjustment assembly is in an installed configuration relative to the wheelchair, such that a change in the position/orientation of the swivel housing (e.g., relative to the swivel) will provide a corresponding change in the position/orientation of the back support of the wheelchair. An outer perimeter of the swivel may be at least generally spherically-shaped, and may interface with a corresponding at least generally spherically-shaped surface of the swivel housing, such that the swivel housing is rotatable relative to the swivel in multiple dimensions (e.g., in at least three dimensions, in one or more embodiments).

The wheelchair back support adjustment assembly may also include what may be characterized as a linkage that interfaces with the swivel assembly. The linkage may be separately mounted (e.g., detachably) to each of the canes of a wheelchair. However, no portion of the linkage contacts/interfaces with the back support of the wheelchair. The above-noted swivel in turn may be mounted on this linkage. The swivel may be mounted on the linkage so as to be unable to rotate about a length dimension of the corresponding portion of the linkage, so as to be movable along such a length dimension of the corresponding portion of the linkage (e.g., at least generally within the noted lateral dimension) to a desired position and with the swivel assembly being configured so as to thereafter maintain the swivel in this desired position along this length dimension, or both.

The noted linkage may be of a configuration that accommodates a plurality of adjustments for the wheelchair back support adjustment assembly (alone or in combination with one or more adjustments of the swivel assembly). In one embodiment the linkage includes a central leg or link (e.g., the above-noted swivel may be mounted on such a central leg), an intermediate leg or link disposed on each side of the central leg, and an end leg or link for each of the intermediate legs. An intermediate connector may connect the central leg with its corresponding intermediate leg. In any case, each end leg may be rotatably connected with a corresponding cane of a wheelchair and may be maintained in a desired fixed position relative to its corresponding cane. Each intermediate leg may also be slidably interconnected with a corresponding end leg (e.g., by a telescoping arrangement), and the linkage may be configured to accommodate each intermediate leg and its corresponding end leg being disposable in each of a number of different collective lengths to provide yet a further adjustment for the wheelchair back support adjustment assembly.

Various aspects of the present invention are addressed by the following paragraphs and in the noted combinations:

1. A wheelchair back support adjustment assembly, comprising:

a swivel assembly, wherein said swivel assembly is the only portion of said wheelchair back support adjustment assembly that engages a back support of a wheelchair when said wheelchair back support adjustment assembly is in an installed configuration.

2. The wheelchair back support adjustment assembly of paragraph 1, wherein said swivel assembly comprises a swivel housing disposed about a swivel.

3. The wheelchair back support adjustment assembly of paragraph 2, further comprising:

a central leg, wherein an outer perimeter of said central leg defines a polygon, wherein said swivel comprises first and second swivel sections that collectively define said swivel, wherein each of said first and second swivel sections comprise mating surfaces disposed in interfacing relation with a corresponding portion of said outer perimeter of said central leg, wherein said swivel assembly is configurable such that said swivel is unable to rotate about a length dimension of said central leg.

4. The wheelchair back support adjustment assembly of paragraph 2, wherein said swivel is maintained in a fixed position relative to said swivel housing when said wheelchair back support adjustment assembly is in the installed configuration.

5. The wheelchair back support adjustment assembly of any of paragraphs 2 and 4, wherein said swivel assembly comprises first and second fasteners disposable between first and second configurations, wherein said first configuration for said first and second fasteners maintains said swivel assembly in a fixed position relative to the back support when said wheelchair back support adjustment assembly is in the installed configuration, and wherein said second configuration for said first and second fasteners allows said swivel housing to move in at least three dimensions relative to said swivel.

6. The wheelchair back support adjustment assembly of paragraph 5, further comprising a central leg, wherein said swivel assembly is mounted on said central leg, wherein said first configuration for said first and second fasteners maintains said swivel assembly in a fixed position relative to said central leg, and wherein said second configuration for said first and second fasteners allows an entirety of said swivel assembly to move axially along said central leg.

7. The wheelchair back support adjustment assembly of paragraph 6, wherein said swivel interfaces with said central leg.

8. The wheelchair back support adjustment assembly of paragraph 7, wherein said central leg and said swivel are configured such that said swivel is unable to rotate about said central leg.

9. The wheelchair back support adjustment assembly of any of paragraphs 5-8, further comprising:

a mounting plate comprising at least one slot, wherein said first and second fasteners extend through said at least one slot.

10. The wheelchair back support adjustment assembly of paragraph 9, wherein said first configuration for said first and second fasteners maintains said swivel assembly in a fixed position relative to mounting plate, and wherein said second configuration for said first and second fasteners allows an entirety of said swivel assembly to move axially along said at least one slot of said mounting plate.

11. The wheelchair back support adjustment assembly of any of paragraphs 2 and 4-10, wherein said swivel housing comprises first and second swivel housings that are detachably connectable and that collectively define said swivel housing.

12. The wheelchair back support adjustment assembly of paragraph 11, wherein said first swivel housing is a mirror image of said second swivel housing.

13. The wheelchair back support adjustment assembly of any of paragraphs 11-12, wherein each of said first swivel housing and said second swivel housing comprise a concave surface that interfaces with a corresponding portion of said swivel.

14. The wheelchair back support adjustment assembly paragraph 13, wherein said concave surface of each of said first swivel housing and said second swivel housing is curved in at least two dimensions.

15. The wheelchair back support adjustment assembly of any of paragraphs 2 and 4-14, wherein an outer perimeter of said swivel, that interfaces with said swivel housing, is curved in at least three dimensions.

16. The wheelchair back support adjustment assembly of any of paragraphs 2 and 4-15, wherein said swivel comprises first and second swivel sections that collectively define said swivel.

17. The wheelchair back support adjustment assembly of paragraph 16, wherein said first swivel section is a mirror image of said second swivel section.

18. The wheelchair back support adjustment assembly of any of paragraphs 2 and 4-17, further comprising:

a linkage comprising a first end connector and an oppositely disposed second end connector, wherein said first end connector and said second end connector are disposed on first and second sides, respectively, of said linkage, wherein said first and second sides are opposite one another, wherein said first end connector and said second end connector are detachably connectable with a corresponding cane of a wheelchair in the installed configuration, wherein said swivel assembly is detachably mounted to said linkage.

19. The wheelchair back support adjustment assembly of paragraph 18, wherein said linkage further comprises:

a central leg;

a first leg on said first side of said linkage;

a first end leg on said first side of said linkage, wherein said first leg is disposed between said central leg and said first end leg;

a second leg on said second side of said linkage; and a second end leg on said second side of said linkage, wherein said second leg is disposed between said central leg and said second end leg.

20. The wheelchair back support adjustment assembly of paragraph 19, wherein said central leg extends along a central axis, wherein said first leg and said first end leg collectively extend along a first axis that is disposed in a different orientation than said central axis, and wherein said second leg and said second end leg collectively extend along a second axis that is disposed in a different orientation than said central axis.

21. The wheelchair back support assembly of paragraph 20, wherein an orientation of said first axis is a mirror image of an orientation of said second axis.

22. The wheelchair back support assembly of any of paragraphs 20-21, wherein said first leg and said first end leg are telescopingly interconnected, and wherein said second leg and said second end leg are telescopingly interconnected.

23. The wheelchair back support assembly of paragraph 22, wherein a collective length of said first leg and said first end leg is adjustable along said first axis, and wherein a collective length of said second leg and said second end leg is adjustable along said second axis.

24. The wheelchair back support assembly of paragraph 23, wherein said first leg and said end first leg are detachably connectable in a fixed position for each said collective length of said first leg and said first end leg, and wherein said second leg and said second end leg are detachably connectable in a fixed position for each said collective length of said second leg and said second end leg.

25. The wheelchair back support assembly of any of paragraphs 20-24, further comprising:

a first connector between said central leg and said first leg, wherein said first connector is separately and detachably connected to said central leg and said first leg; and a second connector between said central leg and said second leg, wherein said second connector is separately and detachably connected to said central leg and said second leg.

26. The wheelchair back support assembly of paragraph 25, wherein said first connector and said second connector each comprise a boss, wherein a first end of said central leg abuts one side of said boss of said first connector and one end of said first leg abuts an opposite side of said boss of said first connector, and wherein a second end of said central leg abuts one side of said boss of said second connector and one end of said second leg abuts an opposite side of said boss of said second connector.

27. The wheelchair back support assembly of any of paragraphs 20-26, wherein when said central leg is disposed within a lateral dimension of a wheelchair in the installed configuration and with a z dimension reference axis being disposed orthogonal to said lateral dimension, said first leg and said first end leg collectively extend in diverging relation to said z dimension reference axis proceeding away from said central leg, and said second leg and said second end leg collectively extend in diverging relation to said z dimension reference axis proceeding away from said central leg.

28. The wheelchair back support adjustment assembly of paragraph 18, wherein said linkage comprises:

a central leg assembly comprising said swivel, a first leg on said first side of said linkage and that extends from one side of said swivel, and a second leg on said second side of said linkage and that extends from an opposite side of said swivel;

a first end leg on said first side of said linkage and movably interconnected with said first leg;

a second end leg on said second side of said linkage and movably interconnected with said first leg.

29. The wheelchair back support adjustment assembly of paragraph 28, wherein said first leg and said first end leg collectively extend along a first axis, and wherein said second leg and said second end leg collectively extend along a second axis that is disposed in a different orientation than said first axis.

30. The wheelchair back support assembly of paragraph 29, wherein an orientation of said first axis is a mirror image of an orientation of said second axis.

31. The wheelchair back support assembly of any of paragraphs 29-30, wherein said first leg and said first end leg are telescopingly interconnected, and wherein said second leg and said second end leg are telescopingly interconnected.

32. The wheelchair back support assembly of paragraph 31, wherein a collective length of said first leg and said first end leg is adjustable along said first axis, and wherein a collective length of said second leg and said second end leg is adjustable along said second axis.

33. The wheelchair back support assembly of paragraph 32, wherein said first leg and said first end leg are detachably connectable in a fixed position for each said collective length of said first leg and said first end leg, and wherein said second leg and said second end leg are detachably connectable in a fixed position for each said collective length of said second leg and said second end leg.

34. The wheelchair back support assembly of any of paragraphs 29-33, wherein when a z dimension reference axis bisects said linkage and extends through said swivel, said first leg and said first end leg collectively extend in diverging relation to said z dimension reference axis proceeding away from said swivel and said second leg and said second end leg collectively extend in diverging relation to said z dimension reference axis proceeding away from said swivel portion.

35. The wheelchair back support assembly of any of paragraphs 28-34, wherein said swivel is maintained in a fixed position relative to each of said first leg and said second leg.

DETAILED DESCRIPTION

Figure 1:
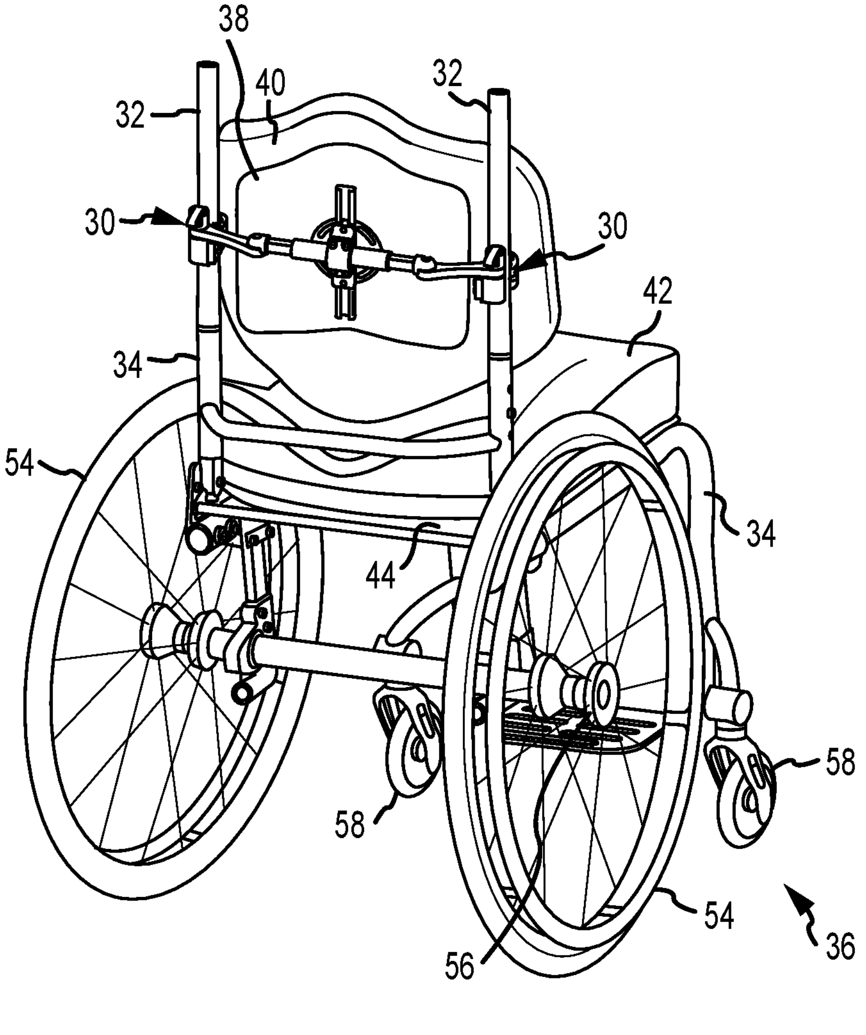
FIG.1 (PRIOR ART)
FIG. 1 is a rear perspective view of a conventional wheelchair with an attached, prior art three-axis adjustable back support assembly.
Figure 2:
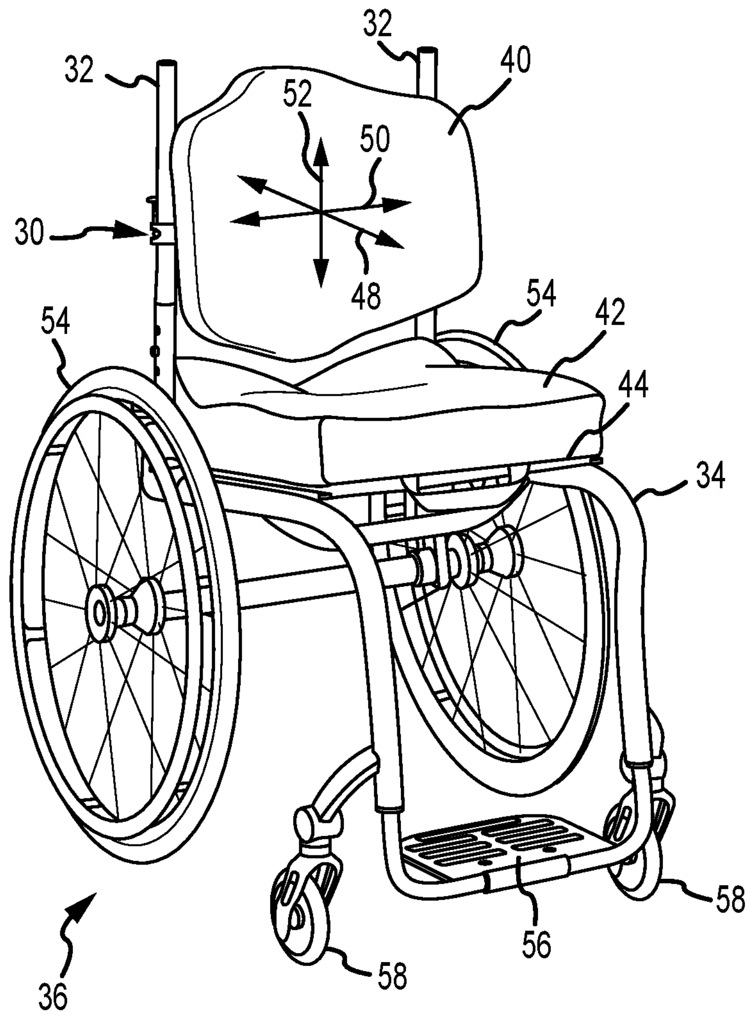
FIG.2 (PRIOR ART)
FIG. 2 is a front perspective view of the wheelchair shown in FIG. 1.
Figure 3:
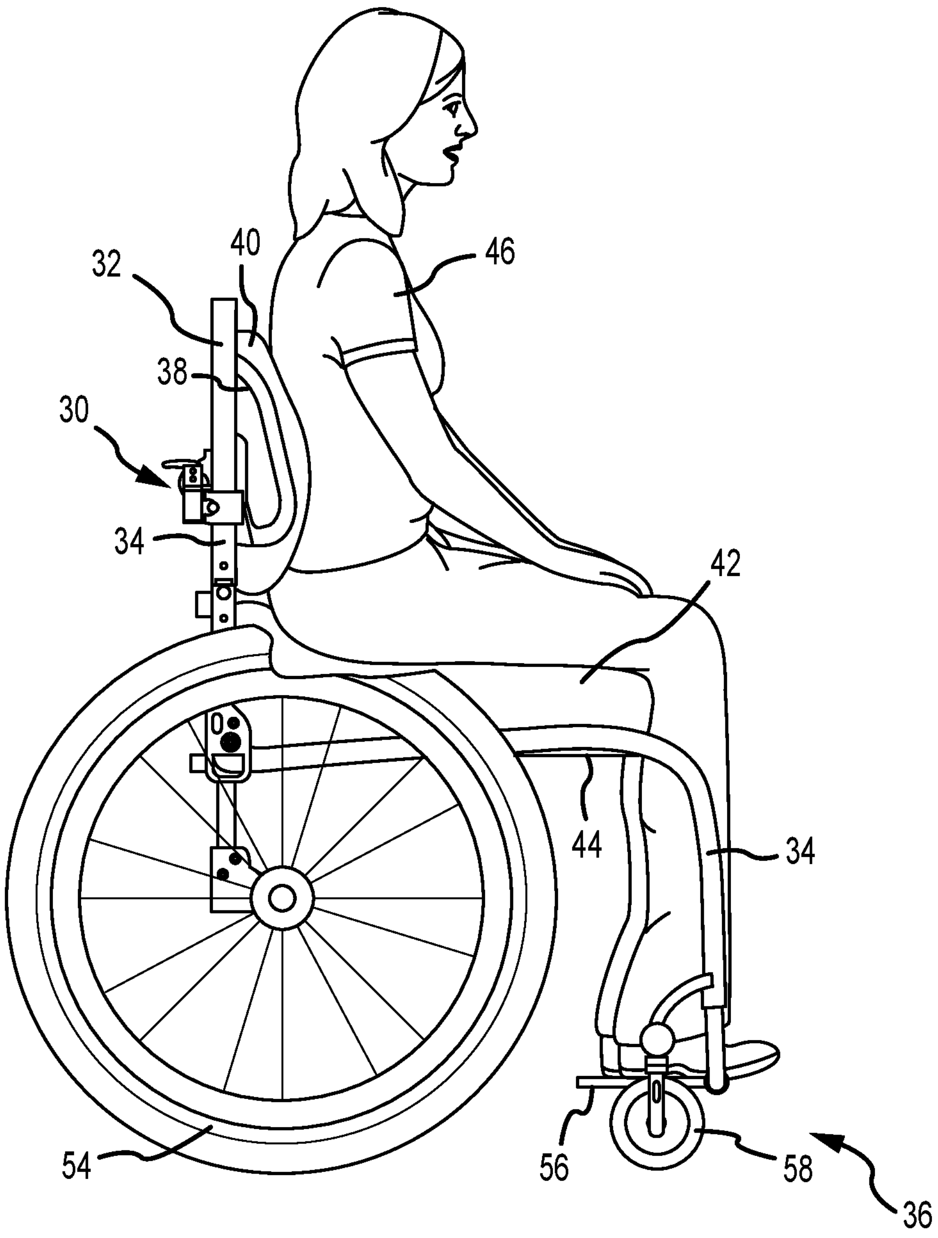
FIG.3 (PRIOR ART)
FIG. 3 is a side elevation view of the wheelchair shown in FIGS. 1-2, upon which a wheelchair user is seated.
Figure 4A:
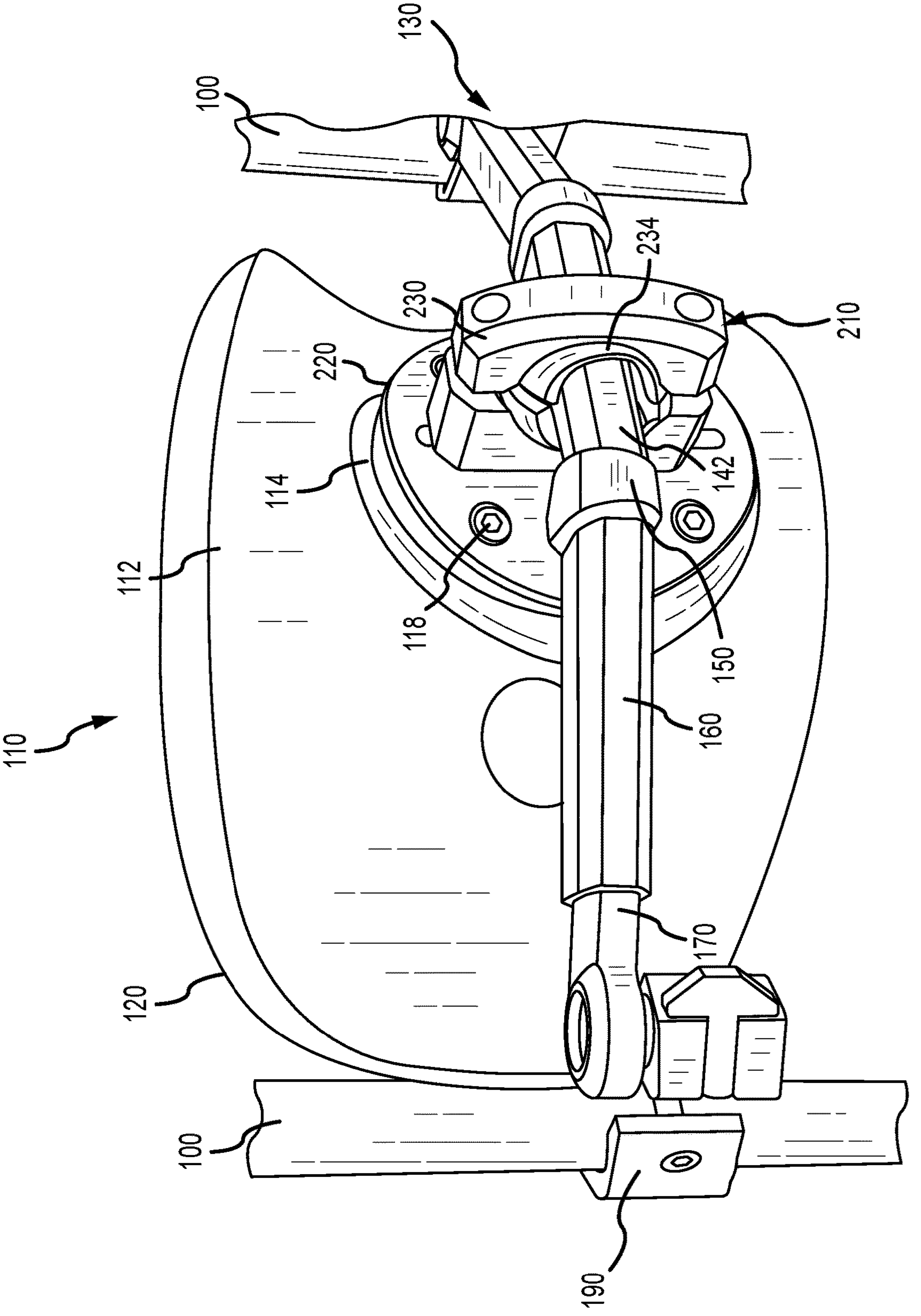
FIG. 4A-4C are perspectives view of a wheelchair back support adjustment assembly mounted on a pair of wheelchair canes.
Figure 4B:
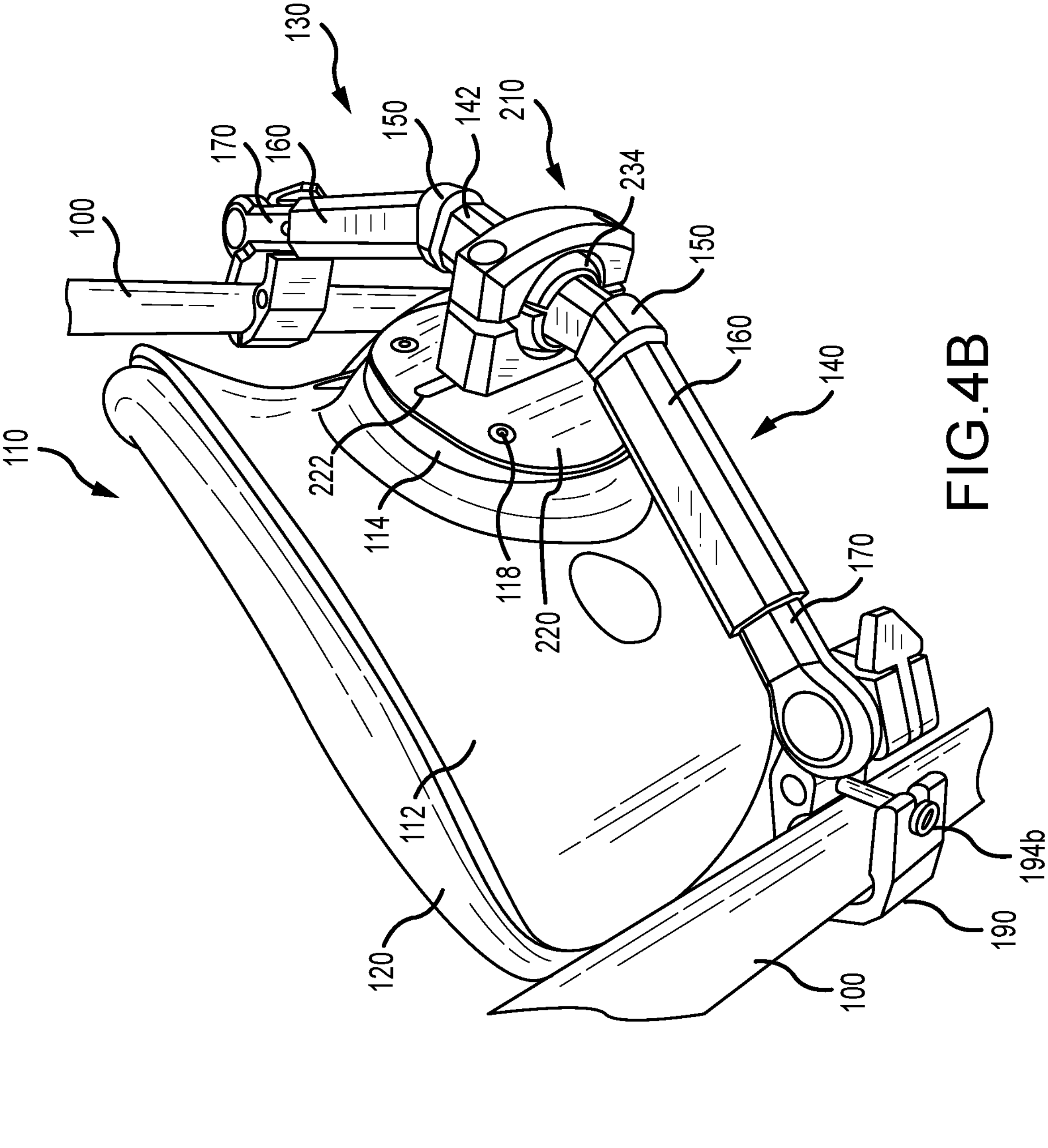
Figure 4C:
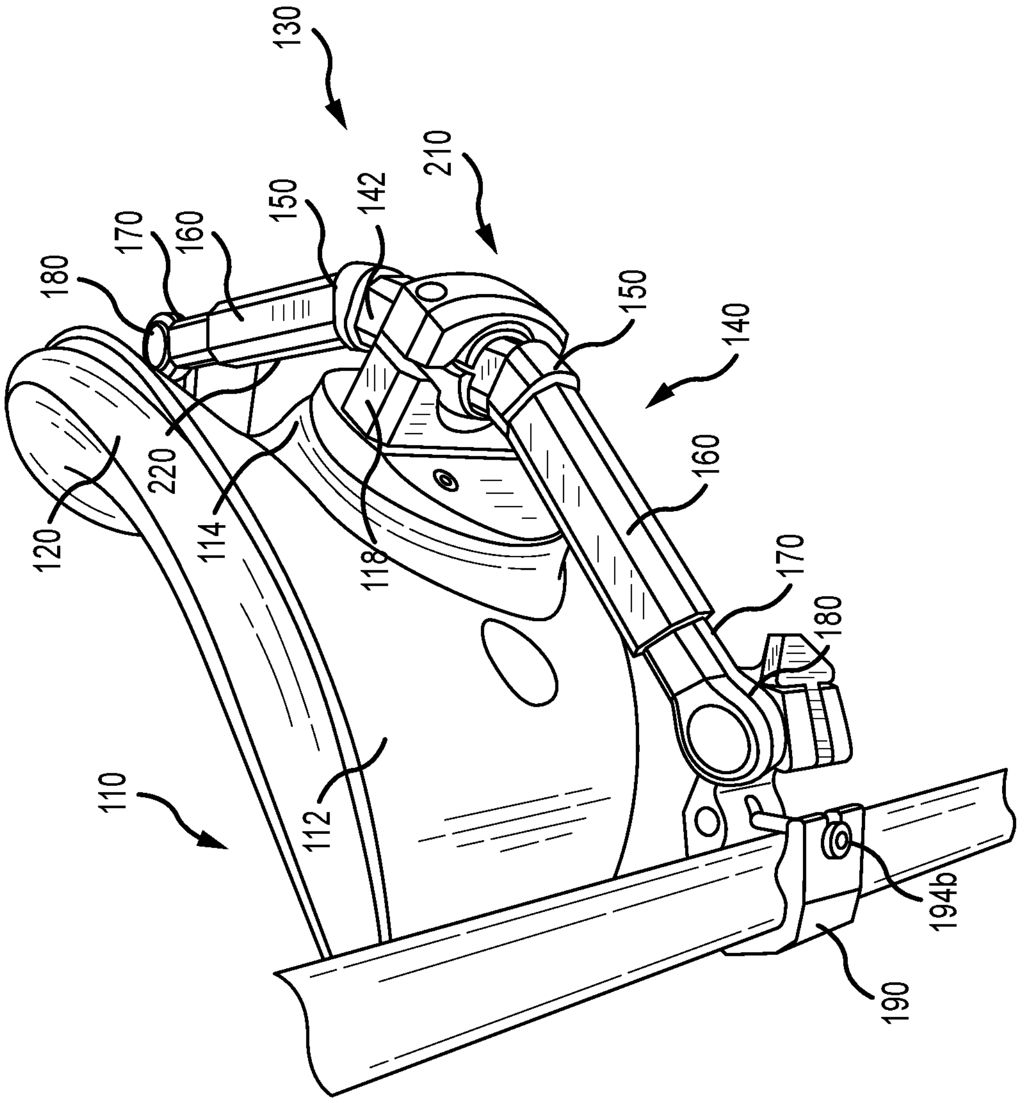

One embodiment of a wheelchair back support adjustment assembly is illustrated in FIGS. 4A-4C and is identified by reference numeral 130. The wheelchair back support adjustment assembly 130 is detachably connectable to a pair of wheelchair canes 100 that are disposed in spaced relation to one another on a wheelchair (e.g., in accordance with the canes 32 of the wheelchair 36 shown in FIGS. 1-3; the canes 100 being spaced in a lateral dimension). As such, the back support adjustment assembly 130 can be installed on the canes 32 of the wheelchair 36 shown in FIGS. 1-3.

Figure 5A:
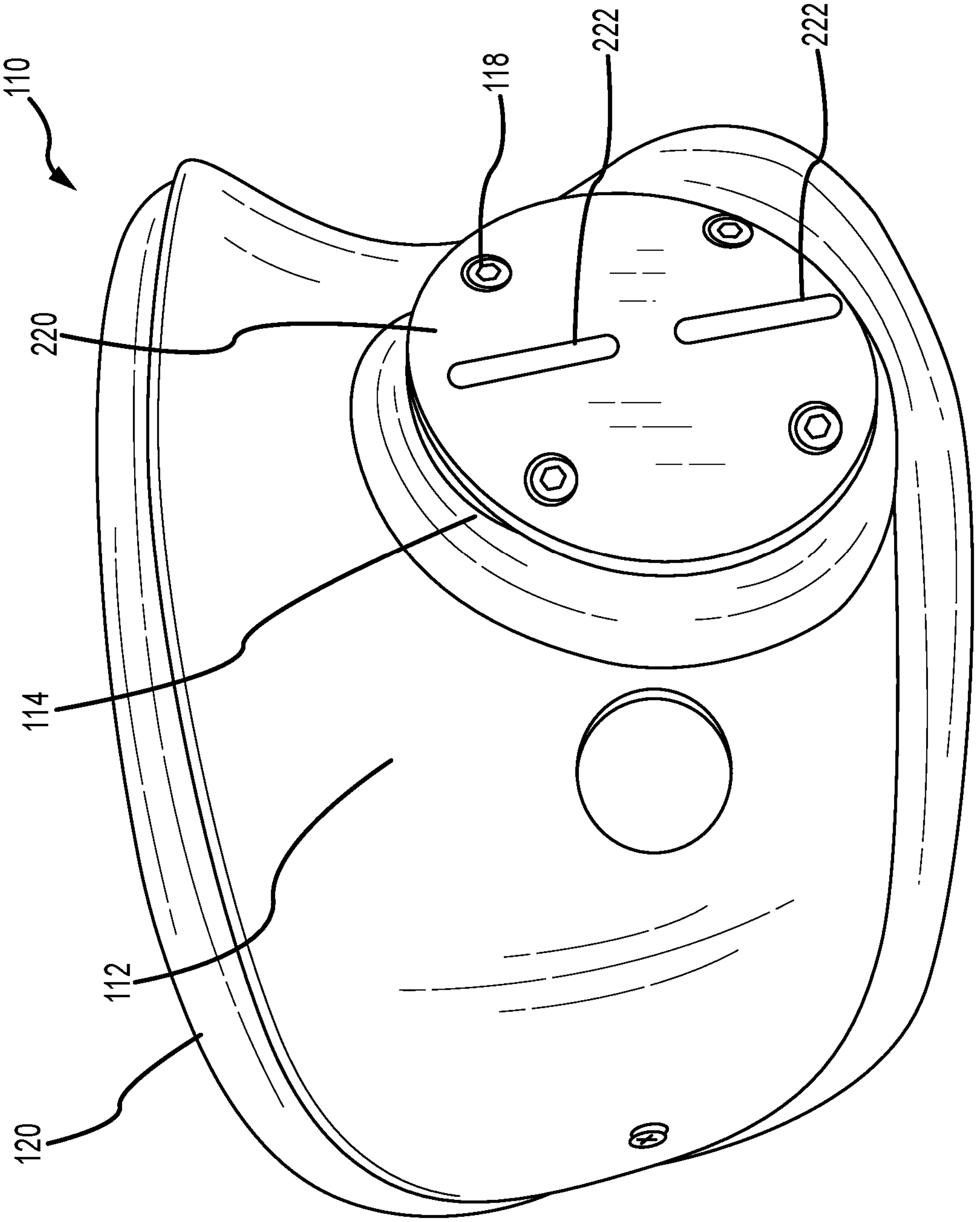
FIGS. 5A and 5B are perspective views of a back support that is engaged by the back support adjustment assembly shown in FIGS. 4A-4C.
Figure 5B:
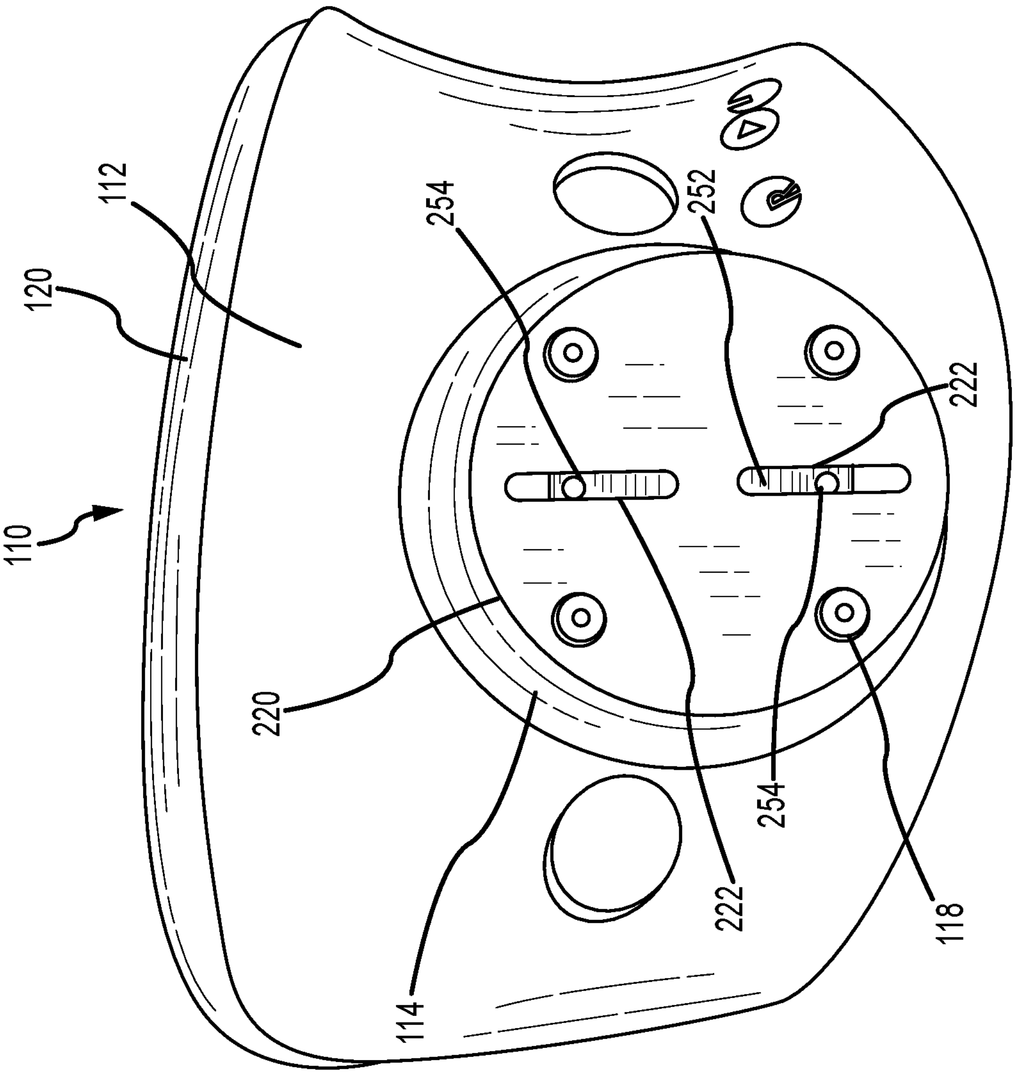

A pair of cane connectors 190 of the back support adjustment assembly 130 are detachably connected to a corresponding wheelchair cane 100. Opposite ends of a linkage or leg assembly 140 of the back support adjustment assembly 130 are detachably connectable to a corresponding cane connector 190. This linkage 140 includes a central leg 142, a pair of intermediate links 160 disposed on opposite sides of the central leg 142, an end leg 170 for each intermediate leg 160, and a linkage end connector 180 for each end leg 170. A swivel assembly 210 is mounted on the central leg 142 of the back support adjustment assembly 130, and is both detachably and movably connectable to a back support 110 for a wheelchair. The back support adjustment assembly 130 can be used with a wheelchair back support of any appropriate size, shape, configuration and/or type. The swivel assembly 210 is the only portion of the back support adjustment assembly 130 that engages the back support 110. That is, the wheelchair back support adjustment assembly 130 utilizes a swivel assembly 210 that provides an entirety of an interconnection between the wheelchair back support adjustment assembly 130 and the back support 110 of a wheelchair The back support 110, that is engaged by the back support adjustment assembly 130 shown in FIGS. 4A-4C, is illustrated in FIGS. 5A and 5B. The back support 110 includes a shell 112 on a rear or back side of the back support 110, along with a cushion 120 on a front side of the back support 110 and that engages a user of a wheelchair that incorporates the back support 110 and back support adjustment assembly 130. The shell 112 is an at least generally rigid structure (e.g., to provide structural support for the back support 110), while the cushion 120 may be configured to provide a desired interface with a wheelchair user (e.g., compressible to at least a certain degree). A mounting platform 114 may be integrally formed with the shell 112 or may be separately attached thereto, provides a mounting location for the swivel assembly 210 of the back support adjustment assembly 130, and protrudes rearwardly from the shell 112 in the illustrated embodiment. A mounting plate 220 of the swivel assembly 210 is shown in FIGS. 5A and 5B in an installed configuration relative to the mounting platform 114. A plurality of fasteners 118 may be used to detachably connect the mounting plate 220 (back support adjustment assembly 130) to the mounting platform 114 (back support 110). The mounting plate 220 includes a pair of axially-extending adjustment slots 222 that are disposed along a common axis.

Figure 6A:
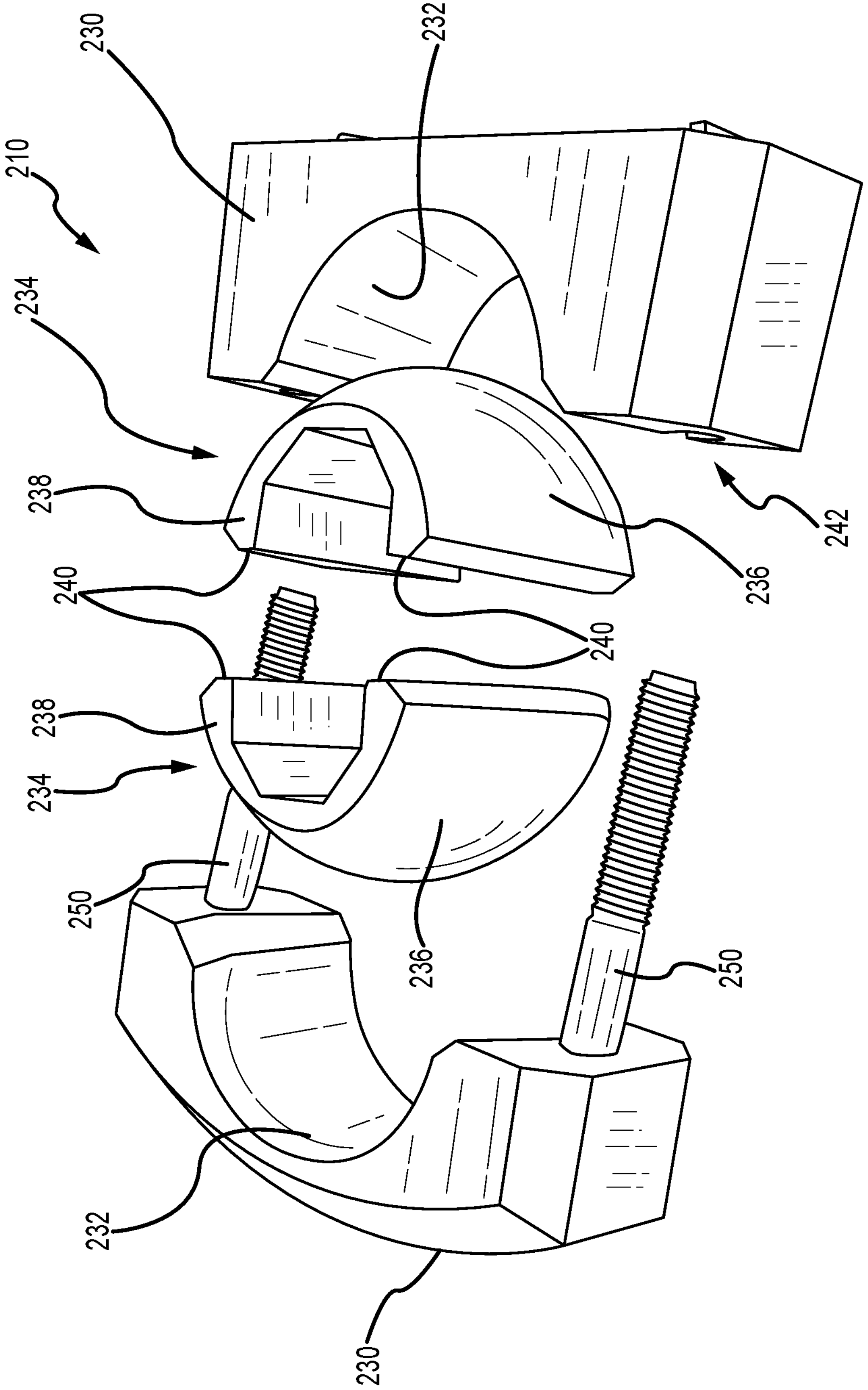
FIGS. 6A and 6B are perspective views of the swivel assembly used by the back support adjustment assembly shown in FIGS. 4A-4C.
Figure 6B:
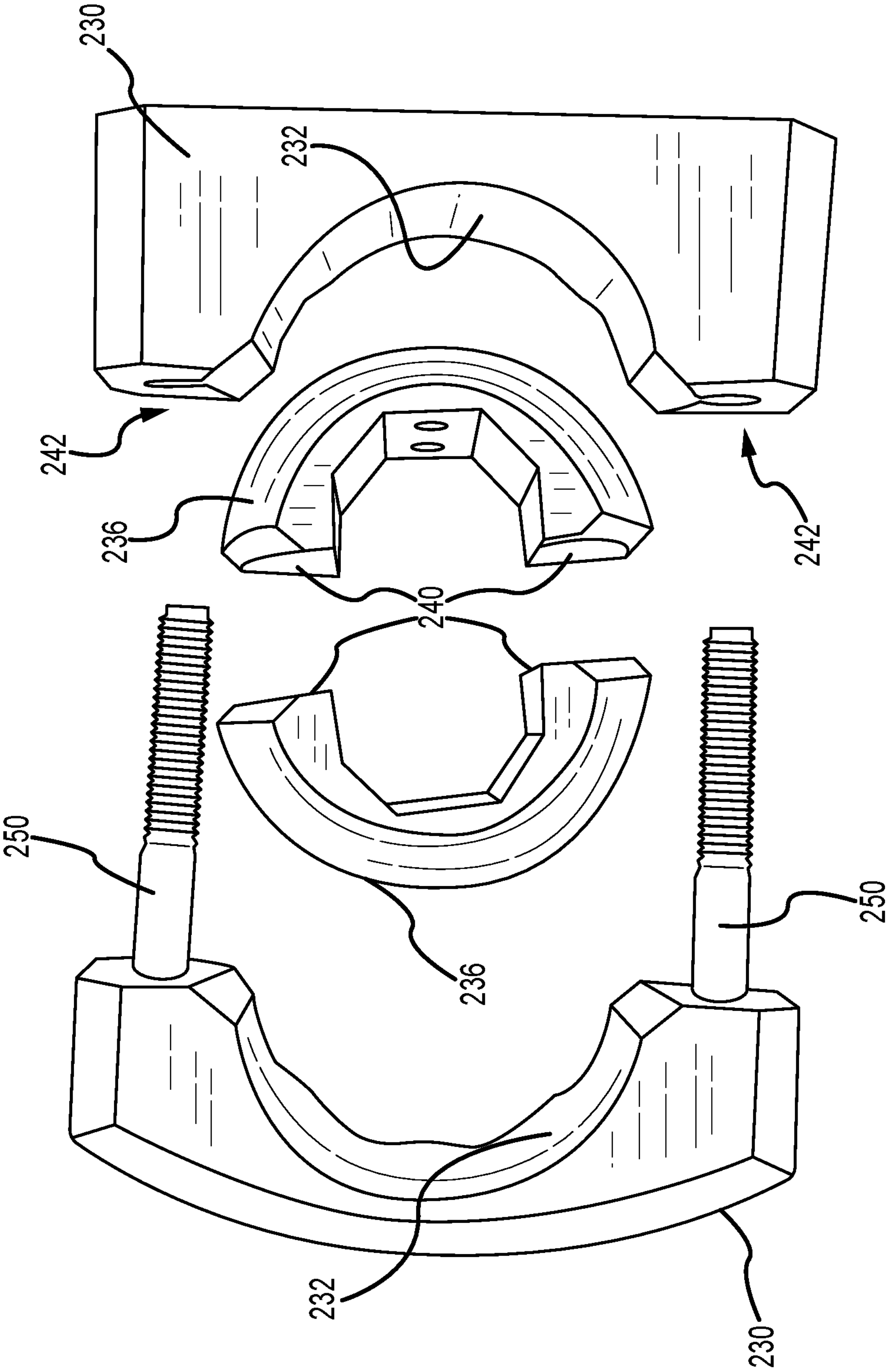
Figure 6C:
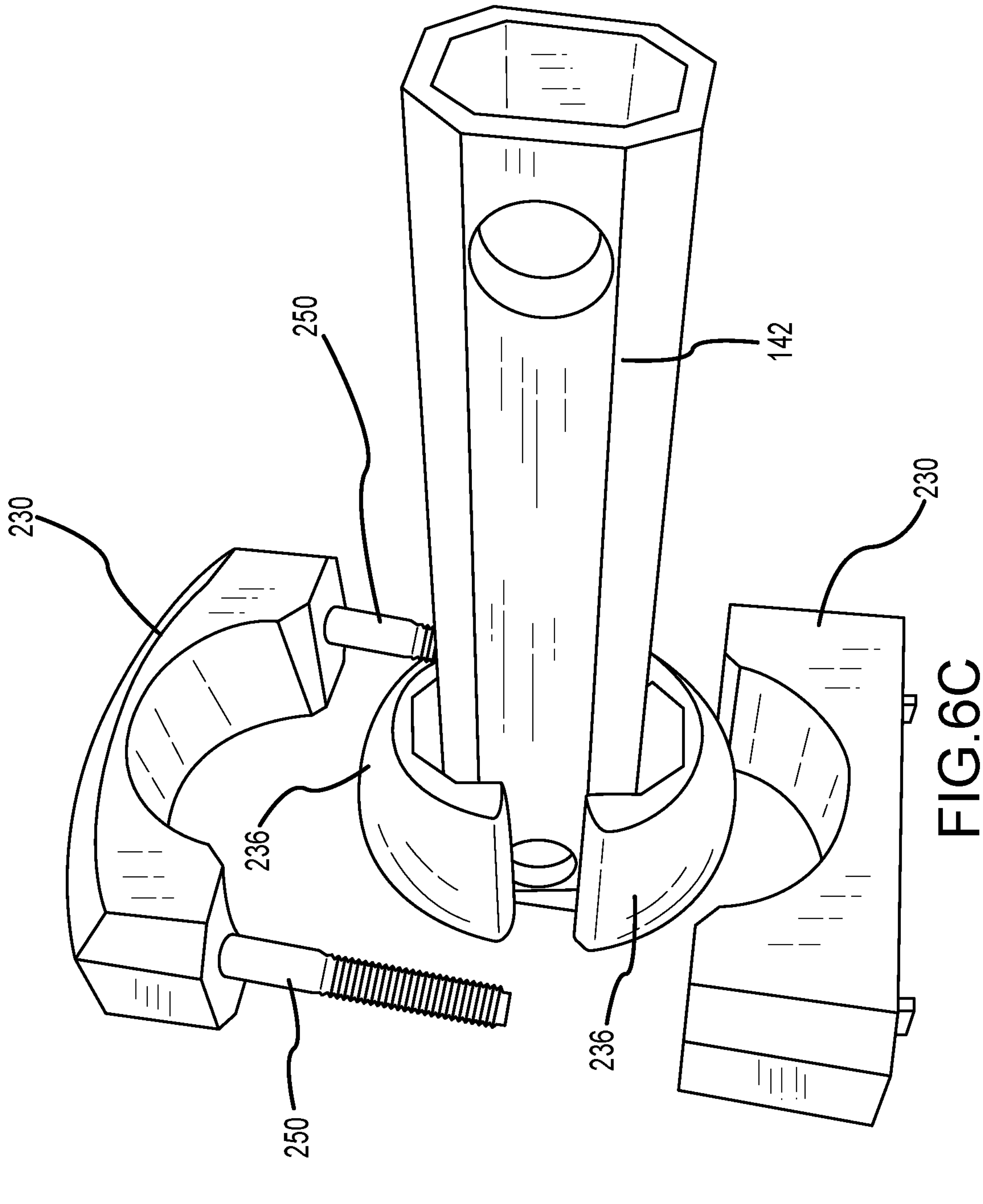
FIG. 6C is a perspective view of the swivel assembly and a central leg of a linkage for the wheelchair back support adjustment assembly shown in FIGS. 4A-4C.

The swivel assembly 210 for the back support adjustment assembly 130 (e.g., FIGS. 4A-4C) is illustrated in more detail in FIGS. 6A-6C. The swivel assembly 210 includes a pair of swivel housings or housing sections 230 (that collectively define a swivel housing) that are disposed in opposing relation to one another and that are collectively secured relative to the mounting plate 220 (again, attached to the mounting platform 114 of the back support 110—see FIGS. 4A-5B) by a pair of fasteners 250 (e.g., threaded bolts). These fasteners 250 extend through a corresponding hole 242 in the corresponding swivel housing 230, through a corresponding slot 222 in the mounting plate 220 (FIGS. 5A-5B), and are threadably engaged with a plate 252 (FIG. 5B). This plate 252 is disposed between the mounting plate 220 and the mounting platform 114 of the back support 110, is slidably interconnected with the mounting platform 114 (e.g., such that the plate 252 is movable in a vertical dimension relative to each of the mounting platform 114 and the mounting plate 220), and includes a pair of threaded holes 254 that are aligned with a corresponding slot 222 for engagement by a corresponding fastener 250. As such, the swivel housings 230 can be maintained in a fixed position relative to the mounting plate 220 through tightening of the fasteners 250 (e.g., the swivel housings 230 will be clamped against the mounting plate 220). Each swivel housing 230 includes a concave, spherically-shaped surface 232 (a swivel interface; e.g., curved in more than one dimension and including curved in at least 3 dimensions) for engaging at least one of the swivel sections 234.

Each swivel section 234 of the swivel assembly 210 includes a convex, spherically-shaped perimeter surface 236 (e.g., curved in more than one dimension and including curved in at least 3 dimensions) that faces/engages the surface 232 of the corresponding swivel housing 230. Each swivel section 234 further includes a pair of oppositely disposed side surfaces 238 that may be flat or planar, along with a pair of oppositely disposed end surfaces 240 that may be flat or planar. The corresponding end surfaces 240 of the swivel sections 234 may be disposed in interfacing relation to one another in an installed configuration, with the swivel sections 234 collectively defining a swivel, a sphere, or a ball for a corresponding movable joint (the movable joint being between the swivel housings 230 and the swivel sections 234).

An interior of the swivel sections 234 (e.g., a side opposite that which engages the surface 232 of the corresponding swivel housing 230) may be configured to receive the central leg 142 of the linkage 140 for the back support adjustment assembly 130, and more specifically such that in the installed configuration the swivel sections 234 are restrained or precluded from rotating about the long axis or length dimension of the central leg 142 (this length dimension corresponding with the direction in which a pair of intermediate connectors 150 of the linkage 140 are spaced from one another by the central leg 142). In the illustrated embodiment the central leg 142 is in the form of a hollow tube having its outer perimeter being in the form of a polygon (e.g., an 8-sided polygon). The interior of each swivel section 234 may include a corresponding number of flats that are disposed in different orientations to engage a corresponding flat on the outer perimeter of the central leg 142. Any appropriate way of integrating the swivel sections 234 with the central leg 142, such that in the installed configuration the swivel sections 234 are restrained or precluded from rotating about the long axis or length dimension of the central leg 142, may be utilized and including for any appropriate configuration/profile of the outer perimeter of the central leg 142 (e.g., the central leg 142 could have a round perimeter, with the swivel sections 234 being mounted on the central leg 142 in a manner such that for the installed configuration the swivel sections 234 are restrained or precluded from rotating about the long axis or length dimension of the central leg 142, for instance by a clamping force exerted by the swivel sections 234 on the central leg 142, by incorporating teeth on interfacing surfaces of one or both of the swivel sections 234 and central leg 142, or the like).

Figure 7A:
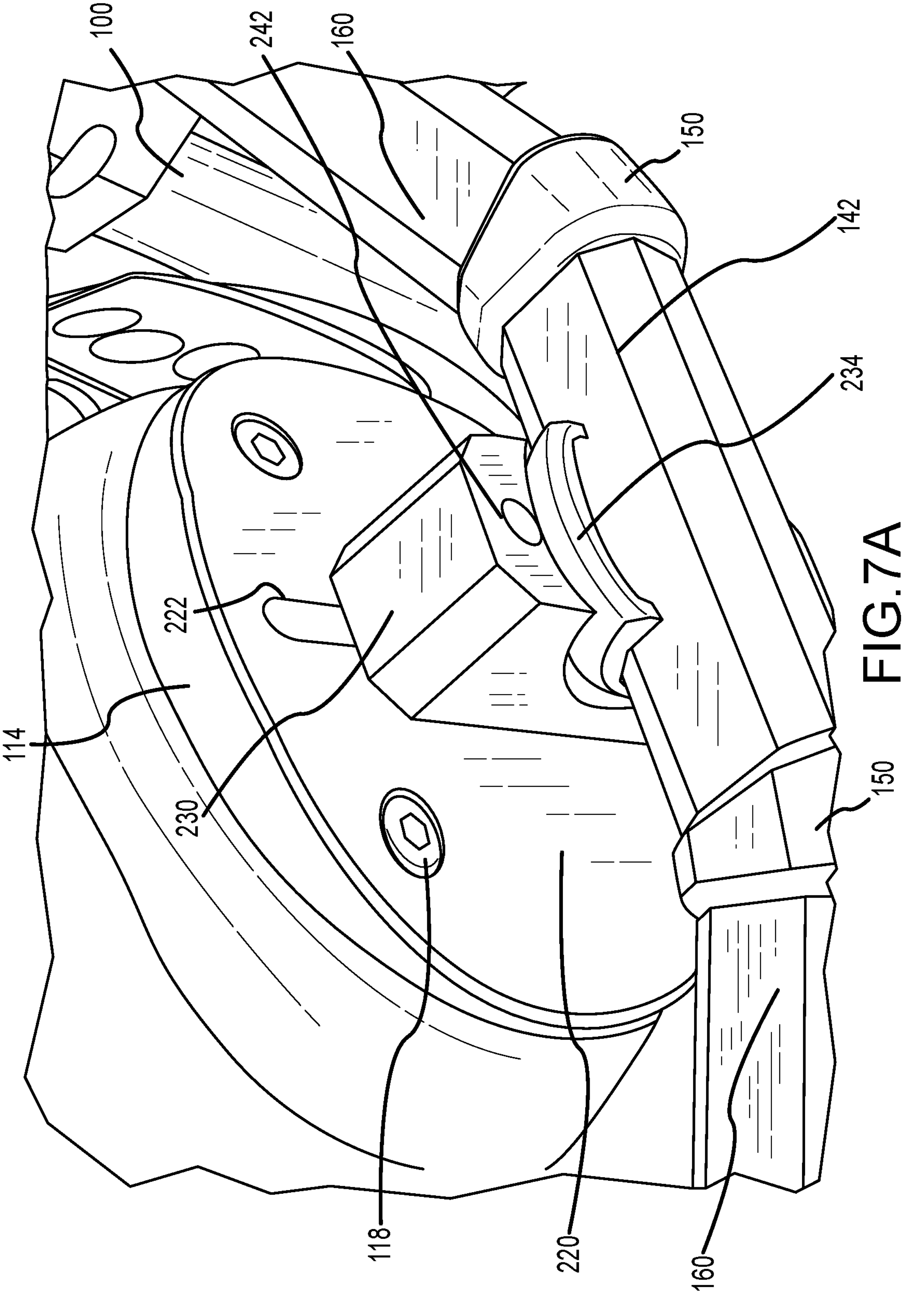
FIG. 7A is a perspective view of the back support adjustment assembly shown in FIGS. 4A-4C, with one of the swivel housings of the swivel assembly being removed.
Figure 7B:
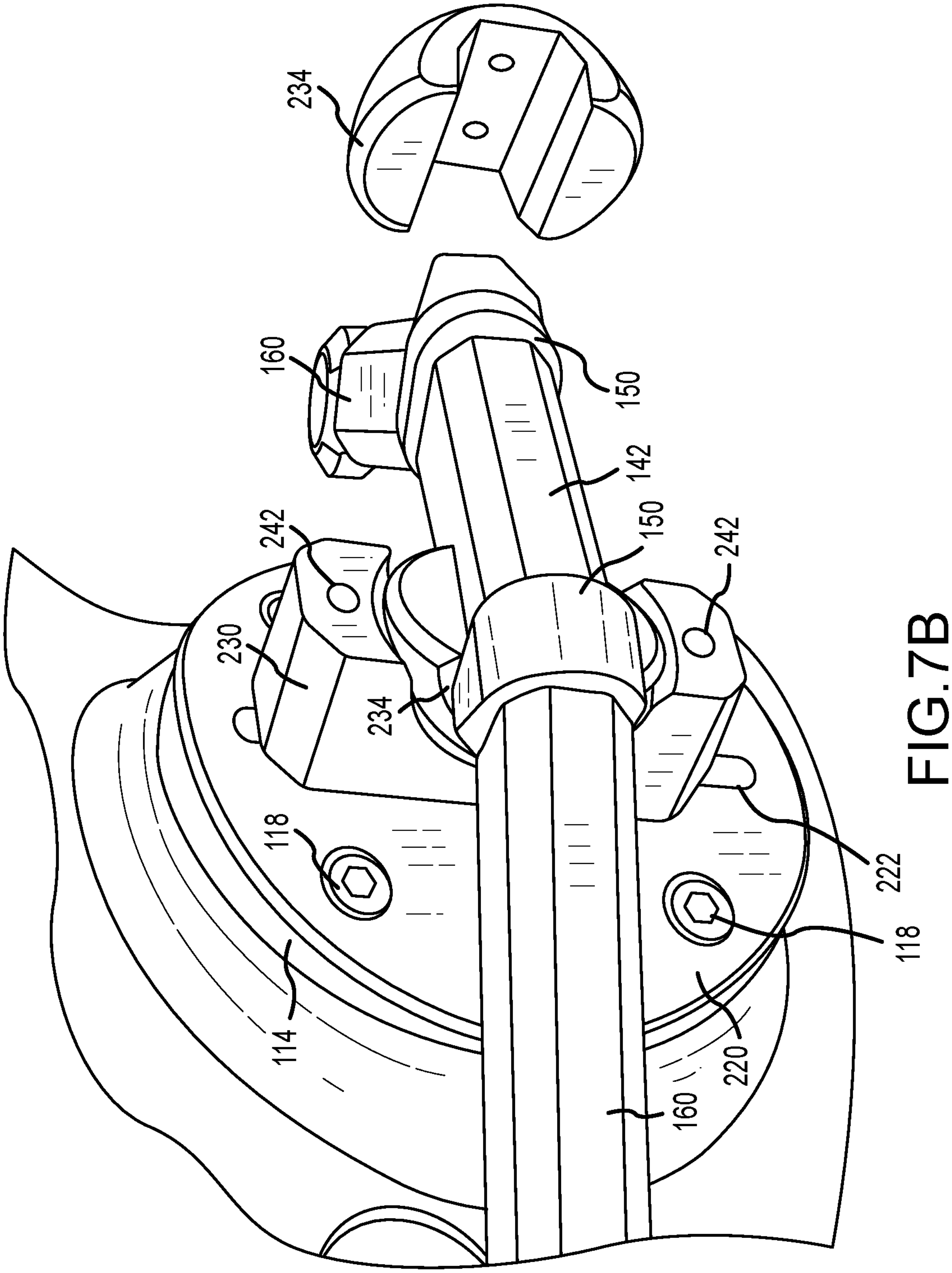
FIGS. 7B and 7C are additional perspective views of the wheelchair back support adjustment assembly shown in FIGS. 4A-4C, showing one of the swivel housings of the swivel assembly being exploded away from the other swivel housing of the swivel assembly.
Figure 7C:
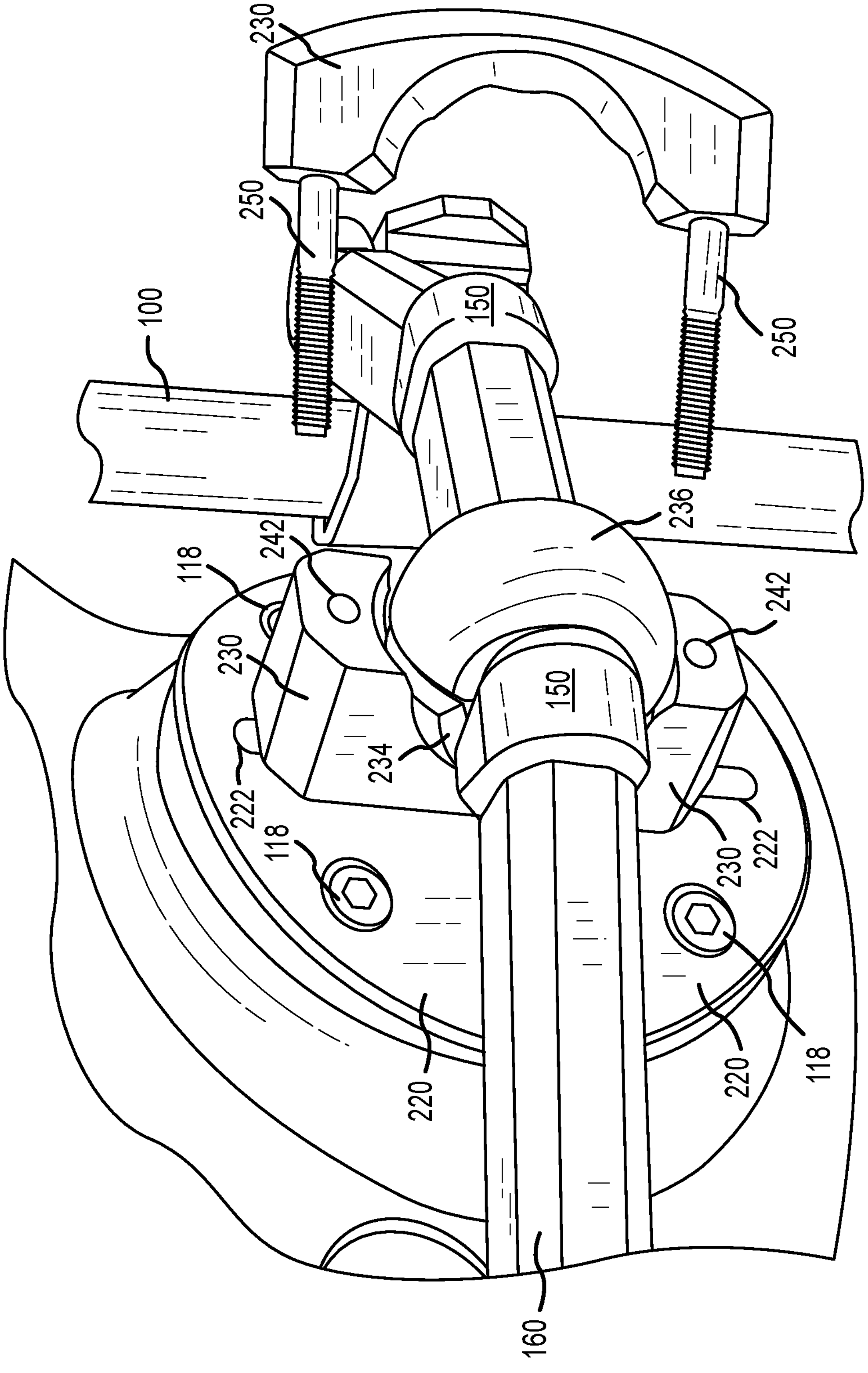
Figure 8A:
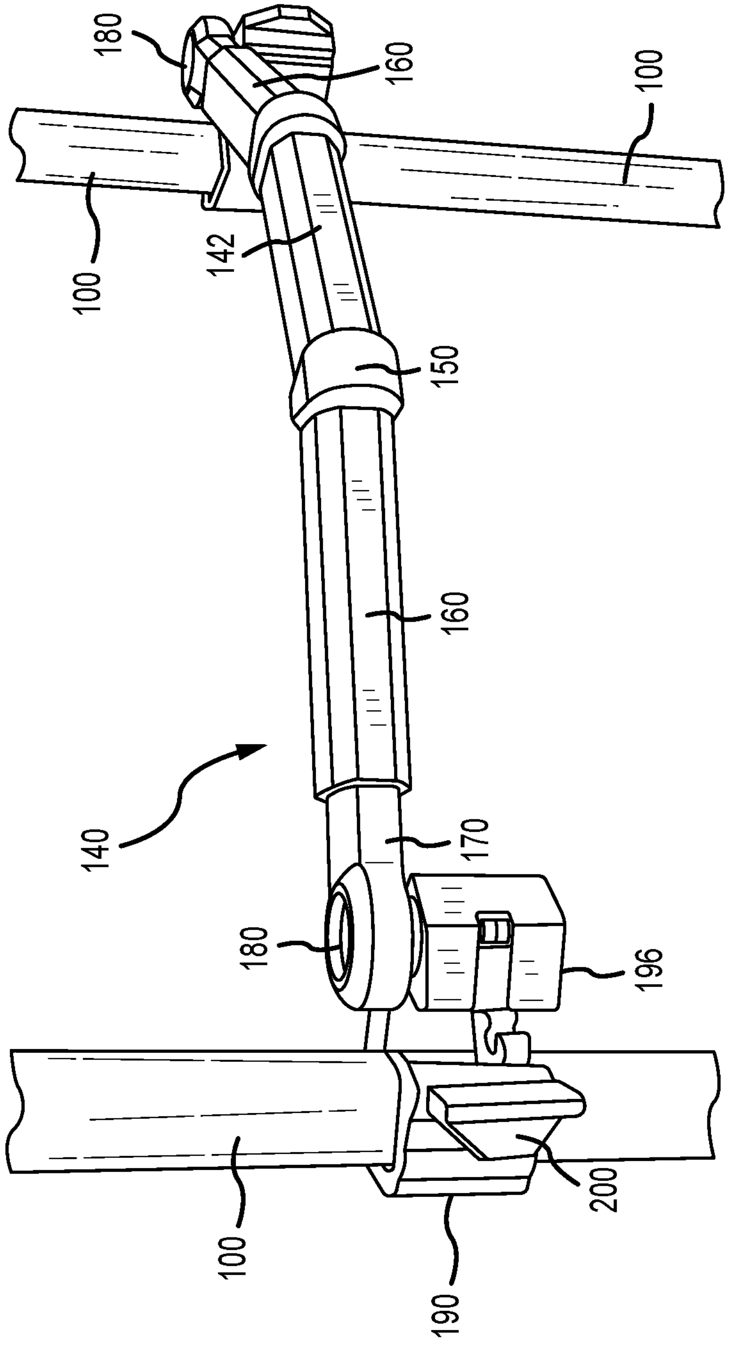
FIG. 8A is a perspective view of a linkage used by the back support adjustment assembly shown in FIGS. 4A-4C, and installed on a pair of wheelchair canes.
Figure 8B:
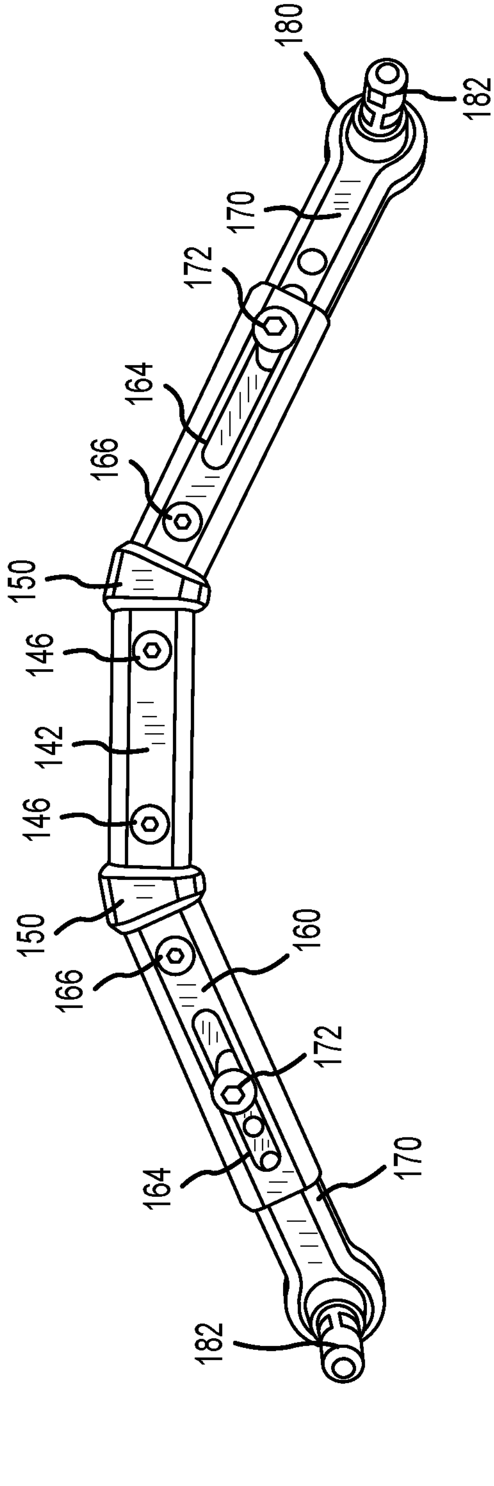
FIG. 8B is a bottom, perspective view of the linkage shown in FIG. 8A.
Figure 8C:
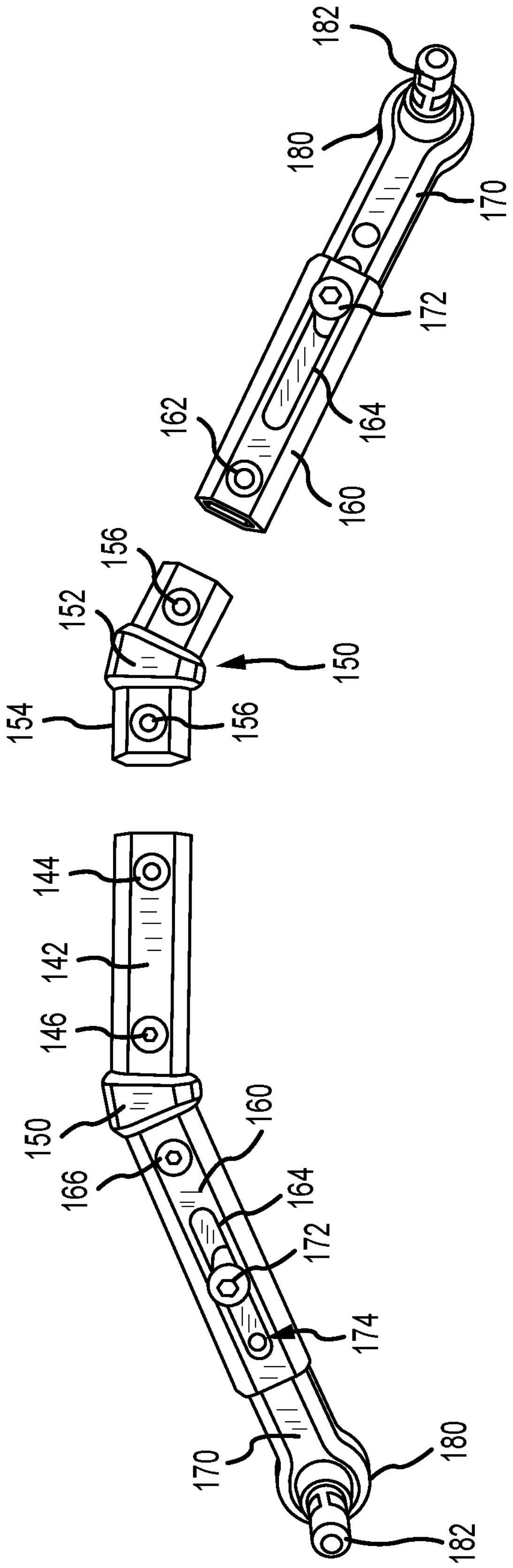
FIG. 8C is a bottom, perspective view of the linkage shown in FIG. 8A, with one of the intermediate connectors being exploded away from the central leg and its corresponding intermediate leg.
Figure 8D:
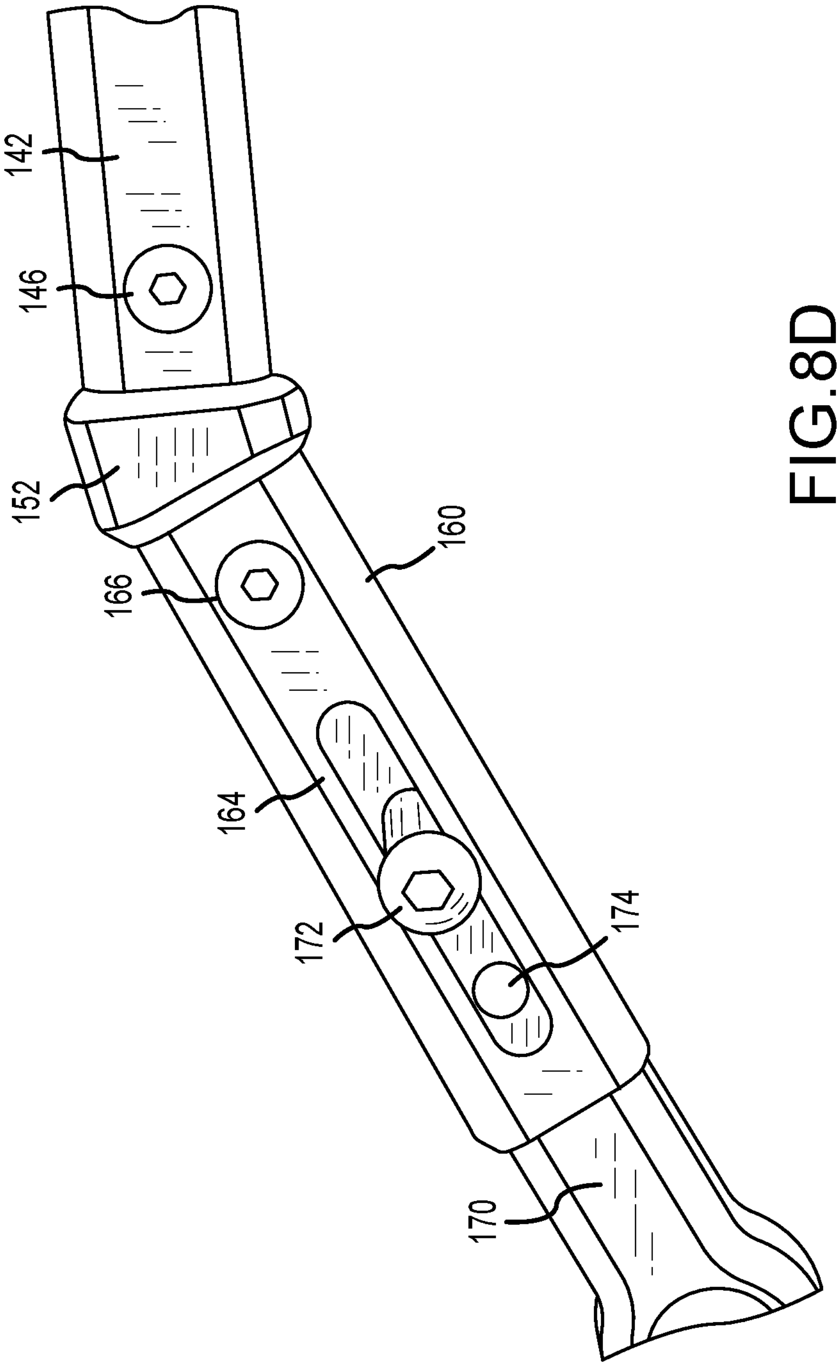
FIG. 8D is an enlarged, bottom, perspective view of the central leg, one of the intermediate legs, and one of the end legs of the linkage shown in FIG. 8A.
Figure 8E:
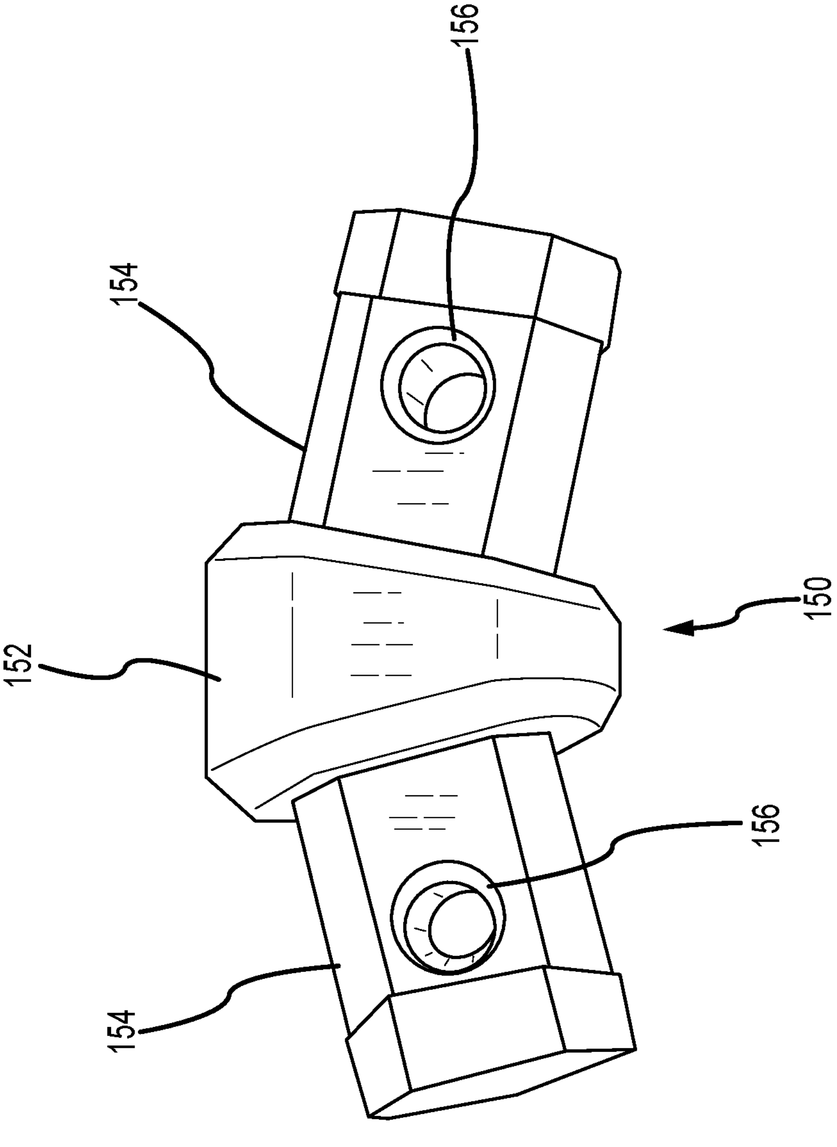
FIG. 8E is an enlarged, perspective view of one of the intermediate connectors of the linkage shown in FIG. 8A.

FIGS. 7A-7C present various views of the swivel assembly 210 in relation to the linkage 140 for the back support adjustment assembly 130 shown in FIGS. 4A-4C. FIG. 7A shows the back/rear swivel housing 230 and back/rear swivel section 234 having been removed, and illustrates the engagement of the interior of the front swivel section 234 with the central leg 142 such that the swivel section 234 is unable to rotate about the central leg 142. The interface between each swivel section 234 and the central leg 142 may be configured such that the only relative movement between the swivel sections 234 and the central leg 142 is along the length dimension of the central leg 142 (e.g., to change the position of the swivel assembly 210 in a lateral dimension-again, the dimension in which the wheelchair canes 100 are spaced from one another).

FIG. 7B shows the back swivel section 234 of the swivel assembly 210 being exploded away from the central leg 142. FIG. 7C illustrates both swivel sections 234 being positioned on the central leg 142, with the back/rear swivel housing 230 being exploded away from the front/forward swivel housing 230, and illustrating the pair of fasteners 250 that are used to secure the swivel assembly 210 to the mounting plate 220 (which again in turn is secured relative to the mounting platform 114 of the back support 110). By simply loosening the two fasteners 250, any one of more of the following adjustments may be made: 1) the swivel housings 230 can be collectively rotated in one or more of at least three different dimensions relative to the two swivel sections 234; and 2) the swivel assembly 210 may be moved axially along the central leg 142 (e.g., an adjustment in the lateral dimension). Changing the position/orientation of the swivel housings 230 in accordance with the foregoing changes the position/orientation of the mounting plate 220 and thereby the position/orientation of the back support 110 relative to the wheelchair.

FIGS. 8A-8E present various views of the linkage 140 for the back support adjustment assembly 130. The linkage 140 includes the above-noted central leg or link 142, a pair of intermediate legs or links 160 (one on each side (in the lateral dimension) of the central leg 142), and a pair of end legs or links 170 (one on each side (in the lateral dimension) of the central leg 142). Each of the legs 142, 160, and 170 (along with legs/links 154 for the intermediate connectors 150 addressed below) may be in the form of a hollow tube (e.g., an outer perimeter of an at least generally rectangular or square configuration; an outer perimeter in the form of a polygon, such as an eight-sided polygon). The central leg 142 includes a pair of holes 144 that are spaced along the length dimension of the central leg 142 (e.g., extending through at least one wall of the central leg 142). These holes 144 may be threaded. Each of the two sides of the linkage 140 (where the two sides are in opposite positions in the lateral dimension) are of a common configuration and may be configured so as to be the mirror image of one another, so only one of these "sides" will be addressed.

An intermediate connector 150 of the linkage 140 is disposed between a corresponding end of the central leg 142 and a corresponding intermediate leg 160. The intermediate connector 150 includes a boss 152 and a pair of legs or links 154 that extend from opposite sides of the boss 152. An included angle is defined between the two legs 154, and this included angle may be in a range of between 90° and 180°

(e.g., about 155° in one embodiment; within a range of about 120° to about 170° in one embodiment). Each leg 154 includes a hole 156 (e.g., extending through at least one wall of the leg 154). These holes 156 may be threaded.

An intermediate leg 160 is disposed between a corresponding intermediate connector 150 and a corresponding end leg 170 on each side of the linkage 140. The bottom of the intermediate leg 160 includes a hole 162 (e.g., threaded) and a slot 164 that extends along the length dimension of the intermediate leg 160 (the length dimension of the intermediate leg 160 coinciding with the direction that its corresponding connector 150 and linkage end connector 180 are spaced from one another in the assembled/installed configuration). Each end leg 170 is disposed between a corresponding intermediate leg 160 and a corresponding linkage end connector 180 on each side of the linkage 140.

One of the legs 154 of the intermediate connector 150 is directed into an open end of the central leg 142 such that the corresponding free end of the central leg 142 engages one side of the boss 152. This should align the hole 144 (central leg 142) with the hole 156 (intermediate connector 150) such that a fastener 146 (e.g., threaded) may be directed therein to detachably connect the central leg 142 and the intermediate connector 150. At least one of the holes 144, 156 may be threaded for threadably engaging the fastener 146 with at least one of the central leg 142 and the intermediate connector 150 to maintain the central leg 142 and the intermediate connector 150 in a fixed position relative to one another.

The other of the legs 154 of a given intermediate connector 150 of the linkage 140 is directed into an open end of the corresponding intermediate leg 160 such that the corresponding free end of the intermediate leg 160 engages an opposite side of the boss 152 (compared to the side of the boss 152 engaged by the central leg 142). This should align the hole 162 (intermediate leg 160) with the hole 156 (intermediate connector 150) such that a fastener 166 (e.g., threaded) may be directed therein to detachably connect the intermediate connector 150 and the intermediate leg 160. At least one of the holes 156, 162 may be threaded for threadably engaging the fastener 166 with at least one of the intermediate connector 150 and the corresponding intermediate leg 160 to maintain the intermediate connector 150 and the intermediate leg 160 in a fixed position relative to one another.

A free end of an end leg 170 of the linkage 140 is directed into an open end of the corresponding intermediate leg 160. The end leg 170 includes a plurality of holes 174 (e.g., threaded) that are spaced along its length dimension (e.g., FIGS. 8C, 8D, and 10E). A fastener 172 extends into/through the slot 164 of the intermediate leg 160 and into an aligned hole 174 of the end leg 170. There is a telescoping relation between the intermediate leg 160 and its corresponding end leg 170 which allows for axial adjustment of the position of the end leg 170 relative to its corresponding intermediate leg 160 (e.g., to change the length of this portion of the linkage 140). The range of axial adjustment is established by the length of the slot 164 in the intermediate leg 160. Loosening the fastener 172 allows the spacing between the corresponding intermediate connector 150 and the corresponding linkage end connector 180 to be adjusted to a desired position, after which the fastener 172 may be tightened such that the intermediate leg 160 and the end leg 170 (along with its corresponding linkage end connector 180) are maintained in a fixed position relative to one another.

The central leg 142 of the linkage 140 (e.g., its length dimension) may be characterized as extending along a central axis. The intermediate leg 160 and end leg 170 on one side of the central leg 142 collectively extend along a first axis, while the intermediate leg 160 and end leg 170 on the opposite side of the central leg 142 collectively extend along a second axis. The central axis, the first axis, and second axis are each disposed in different orientations relative to one another. The orientation of intermediate leg 160 and end leg 170 on one side of the central leg 142 may be the mirror image the orientation of the intermediate leg 160 and end leg 170 on the opposite side of the central leg 142. In the case where the central leg 142 is disposed such that its central axis extends in the lateral dimension (e.g., corresponding with the width of a wheelchair on which the wheelchair back support adjustment assembly 130 is installed), and where a z dimension reference axis bisects the central leg 142 (and is orthogonal to both the lateral dimension and a vertical dimension): 1) the intermediate leg 160 and end leg 170 on one side of the central leg 142 diverge from this z dimension reference axis in proceeding away relative to the central leg 142; and 2) the intermediate leg 160 and end leg 170 on the opposite side of the central leg 142 also diverge from this z dimension reference axis in proceeding away relative to the central leg 142 (e.g., the spacing between corresponding portions of the portions of the linkage 140 on opposite sides of the central link 142 progressively increases proceeding away from the central leg 142).

FIGS. 9A-9F present various views of one of the linkage end connectors 180 for the linkage 140 shown in FIGS. 4A-4C. Each linkage connector 180 includes a connector pin 182 that detachably engages its corresponding cane connector 190. The connector pin 182 is able to rotate relative to its corresponding cane connector 190 (e.g., during various adjustment of the linkage 140). The connector pin 182 includes a recess 184 that extends about the entire circumference of the connector pin 182 and that provides one way to restrain/preclude relative movement between the end connector 180 and its corresponding cane connector 190 when in an installed configuration.

Each cane connector 190 is of a common configuration and is detachably connected with a corresponding wheelchair cane 100. The cane connector 190 includes a clamp housing 192. A clamping screw 194*b* extends between opposing portions of the clamp housing 192, and is threadably engaged with a barrel nut 194*a* associated with one of these portions (e.g., the head of the clamping screw 194*b* and the barrel nut 194*a* may be disposed on opposing portions of the clamp housing 192 that are movable relative to one another (e.g., by flexure of the clamp housing 192) to engage/disengage the cane connector 190 relative to the corresponding wheelchair cane 100. Tightening the clamping screw 194*b* causes the clamp housing 192 to exert a compressive force on the corresponding wheelchair cane 100 to dispose the cane connector 190 in a fixed position relative to the corresponding wheelchair cane 100. The cane connector 190 can of course be positioned at various locations along the length dimension of the corresponding wheelchair cane 100 by loosening the clamping screw 194*b*.

Each cane connector 190 also includes what may be characterized as a pin housing 196. The pin housing 196 and the clamp housing 192 could be integrally formed, or could be separately formed and appropriately attached to one another. In any case, the pin housing 196 and the clamp housing 192 are at least generally disposed in a fixed position relative to one another. When the clamping screw

194*b* has been sufficiently loosened, the pin housing 196 and clamp housing 192 may be collectively rotated about the corresponding wheelchair cane 100. At least part of the clamp housing 192 may move relative to the pin housing 196 when tightening the clamping screw 194*b* (the portion that flexes) to secure the cane connector 190 to the corresponding wheelchair cane 100.

A hole 198*a* extends from an exterior of the pin housing 196, intersects a slot 198*b* of the pin housing 196, and continues extending into (including through) an aligned portion of the pin housing 196. The connector pin 182 of the corresponding linkage end connector 180 may be directed into the hole 198*a*. With the end connector 180 being seated against the upper surface of the cane connector 190, the recess 184 on the outer perimeter of the connector pin 182 should be aligned with the slot 198*b* of the pin housing 196.

Figure 9A:
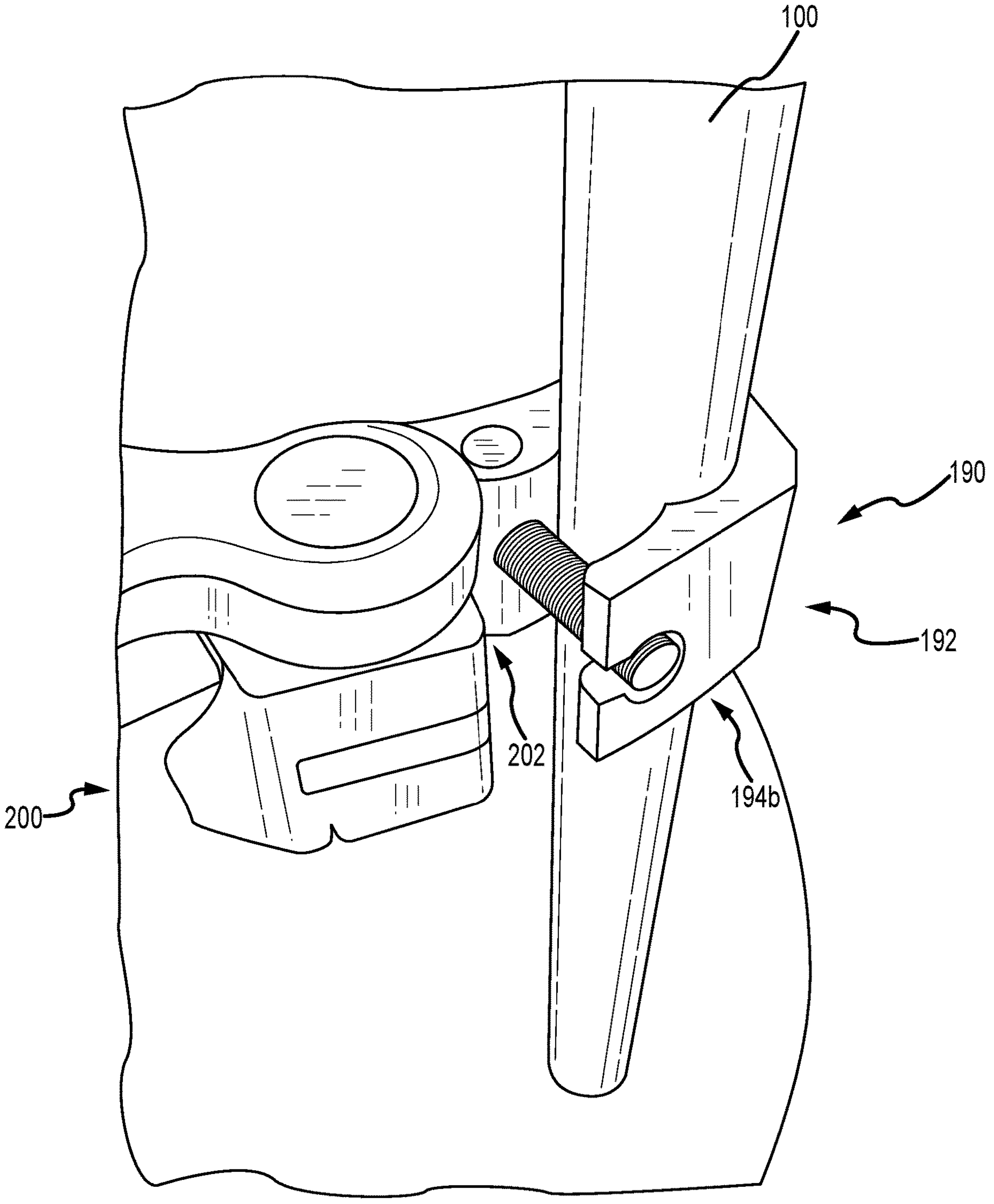
FIG. 9A is an enlarged, perspective view of a cane connector that interconnects a wheelchair cane with the back support adjustment assembly shown in FIGS. 4A-4C.
Figure 9B:
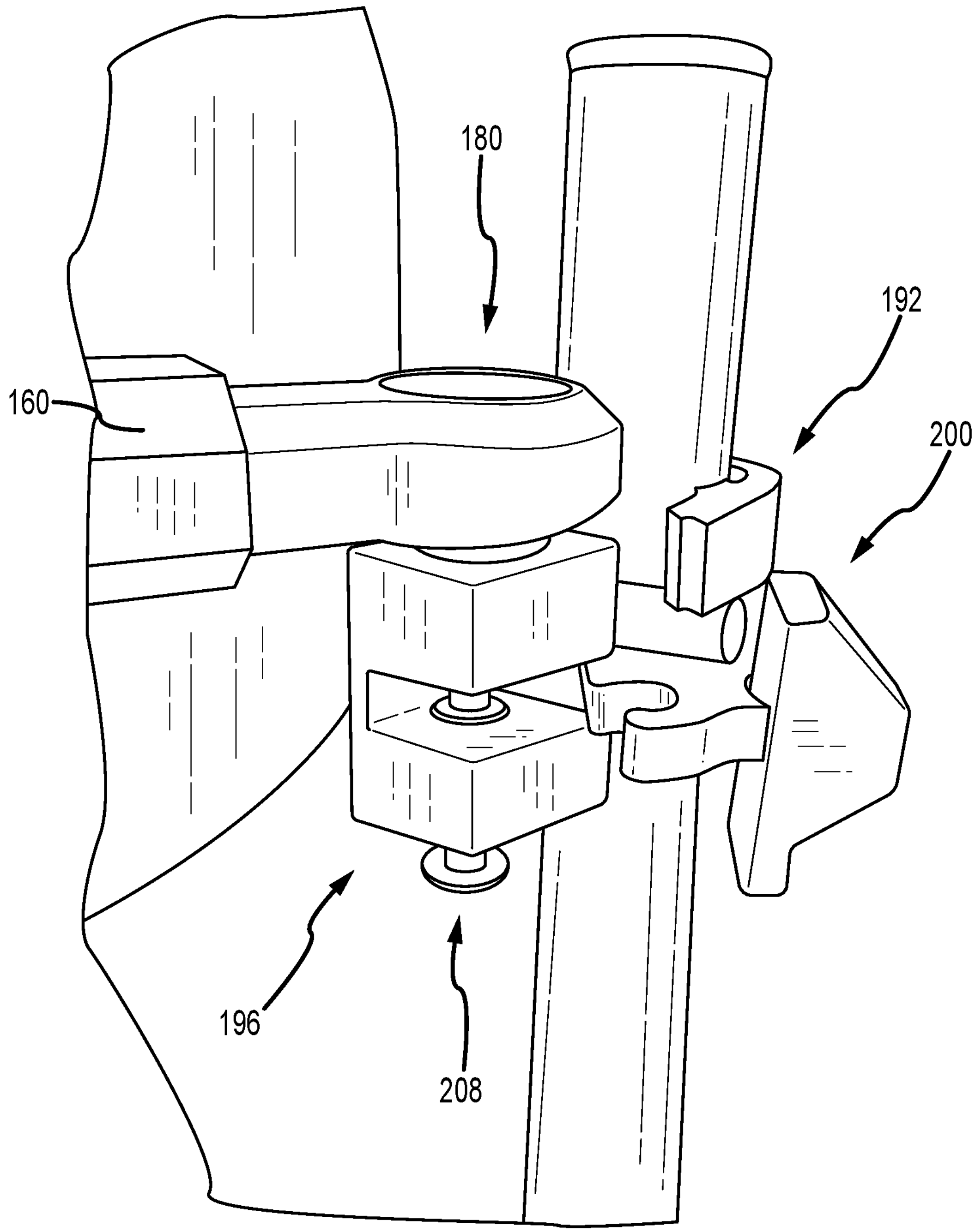
FIG. 9B is an enlarged, perspective view of the cane connector shown in FIG. 9A, with a latch of the cane connector being in an open position to allow installation/removal of an end connector for the linkage shown in FIG. 8A.
Figure 9C:
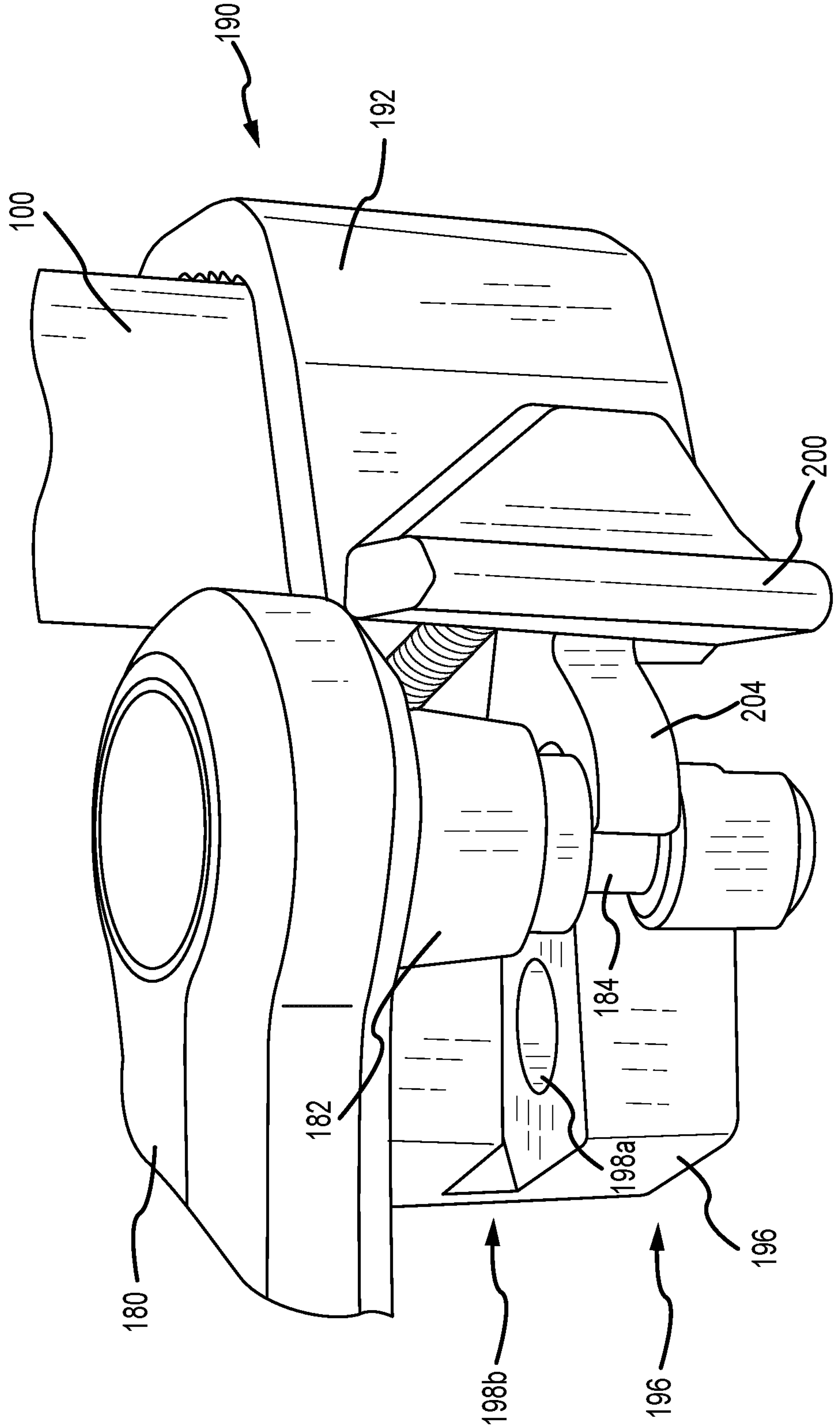
FIG. 9C is an enlarged, perspective view of a connector pin of an end connector for the linkage shown in FIGS. 4A-4C, illustrating how the latch of the cane connector engages this connector pin.
Figure 9D:
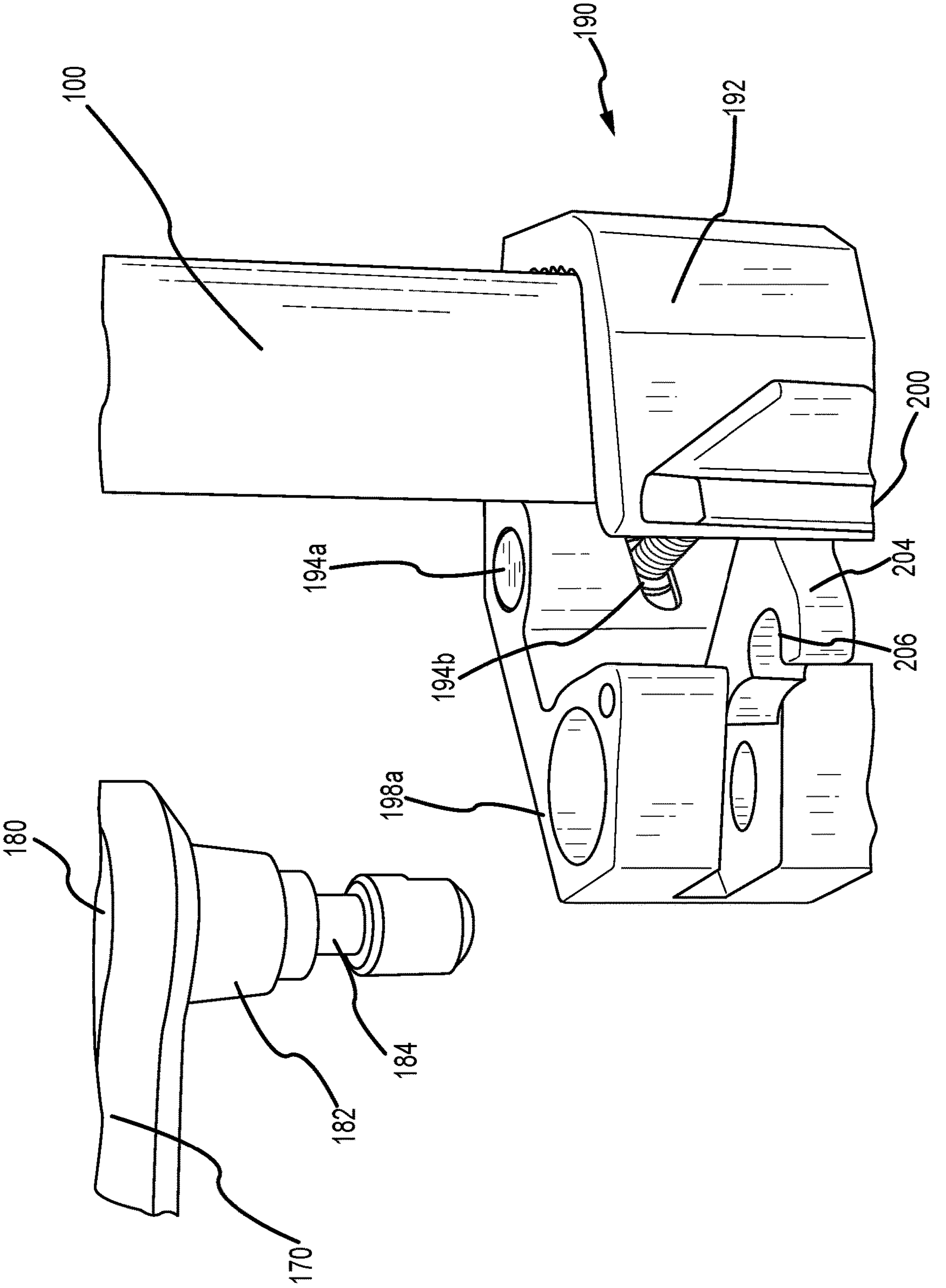
FIG. 9D is an enlarged, perspective view of a connector pin of an end connector for the linkage shown in FIGS. 4A-4C, in spaced relation to a pin housing for the cane connector shown in FIGS. 9A-9C, and with the latch of the cane connector being in an open position.
Figure 9E:
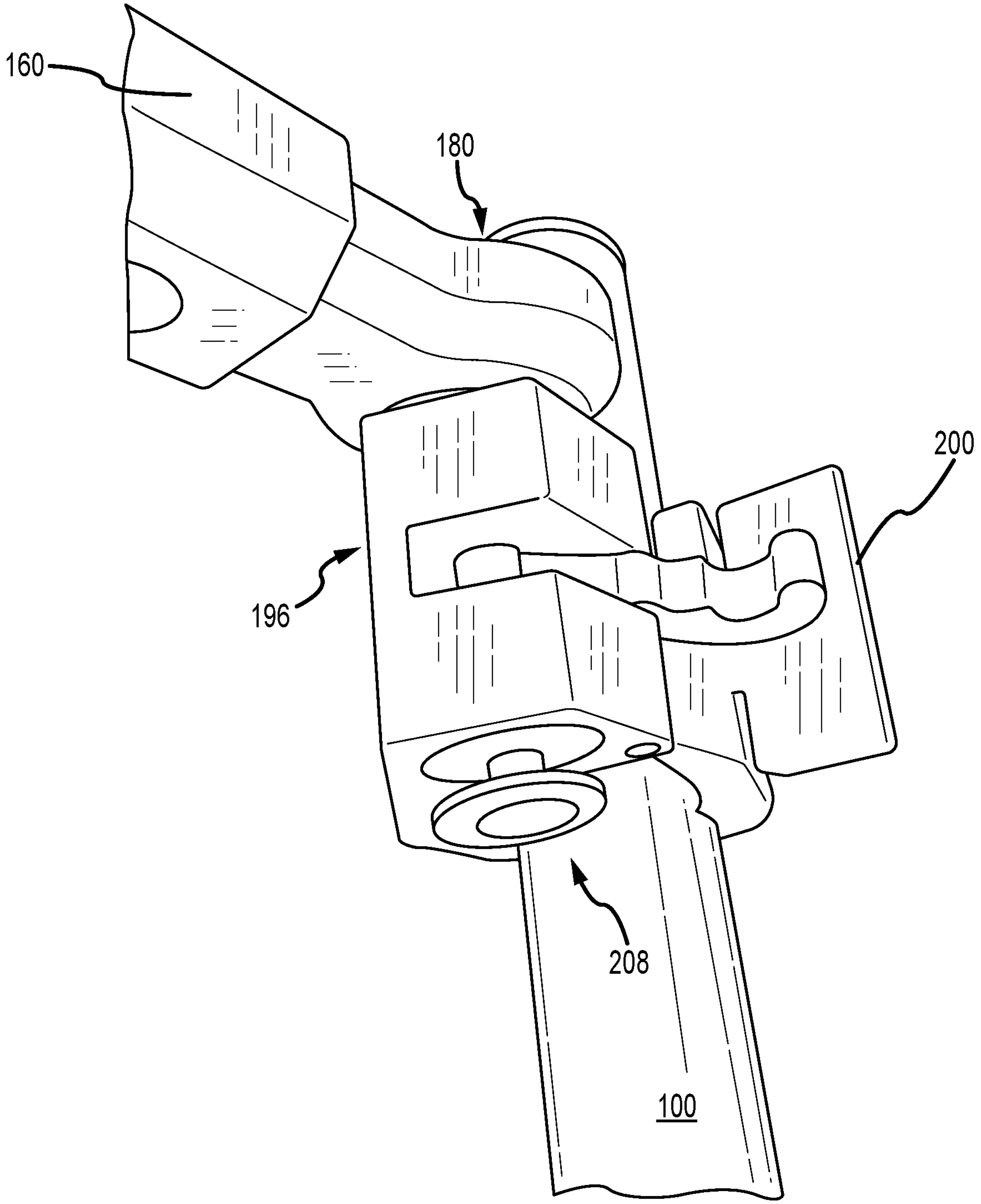
FIG. 9E is an enlarged, perspective view showing a fastener that engages the connector pin of a linkage end connector when installed on the cane connector shown in FIG. 9A-9D.
Figure 9F:
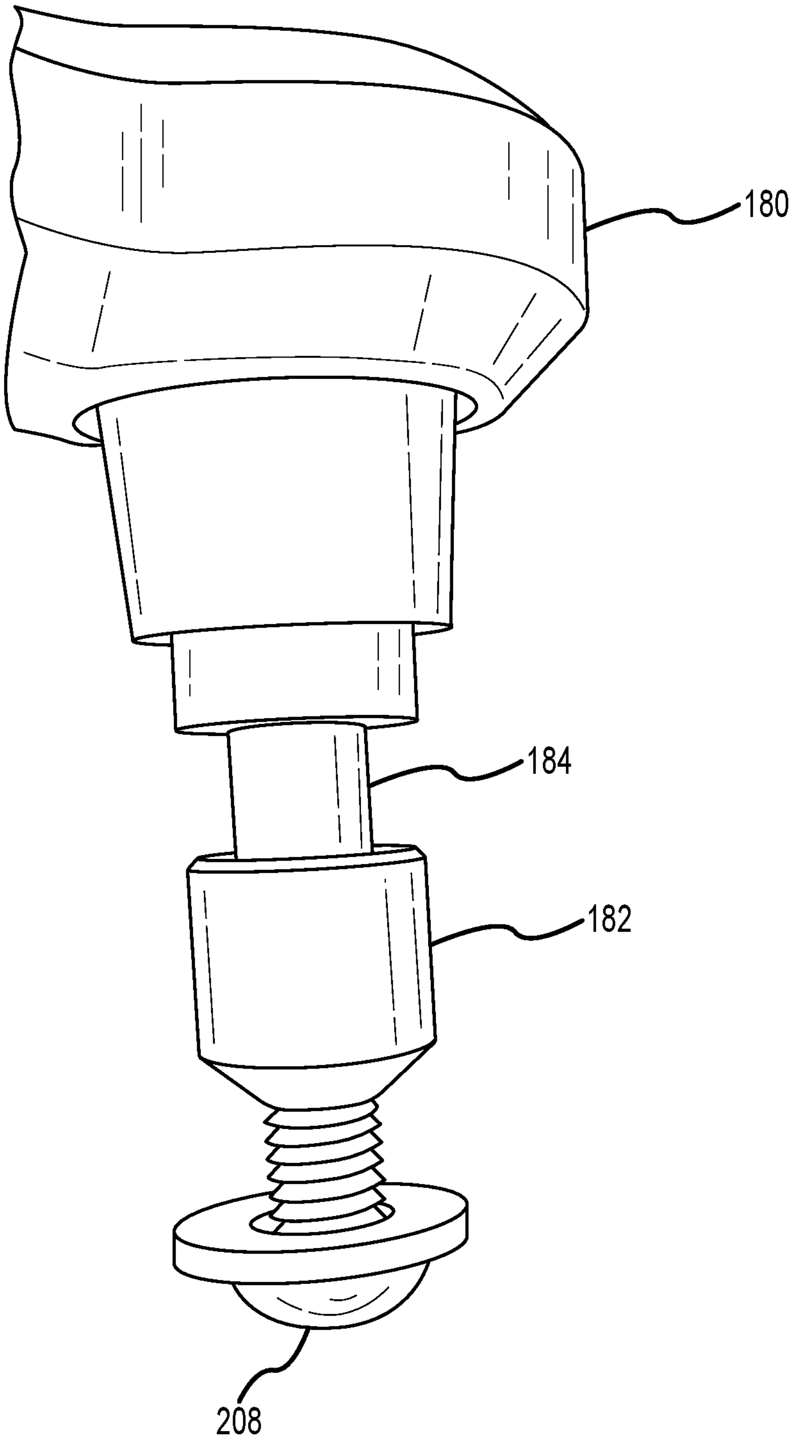
FIG. 9F is an enlarged, perspective view of the fastener shown in FIG. 9E, engaged with an end of a connector pin of a linkage end connector.
Figures 10A, 10B, 10C:
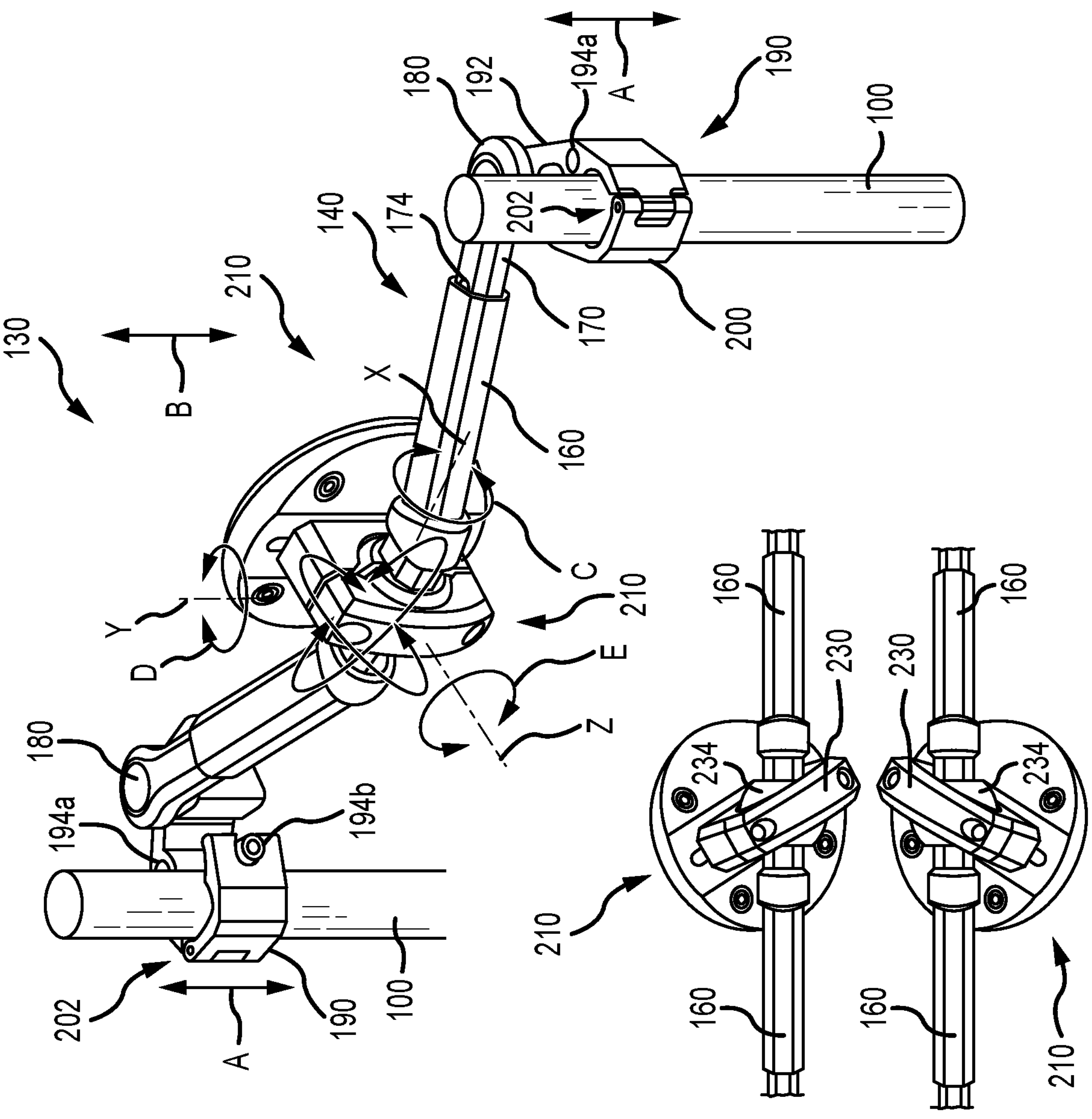
FIG. 10A is a perspective view of the back support adjustment assembly shown in FIGS. 4A-4C, as installed on a pair of wheelchair canes.
FIGS. 10B and 10C show representative positions of the swivel assembly used by the back support adjustment assembly shown in FIG. 10A.

Each cane connector 190 further includes a latch 200, which is movably connected with the clamp housing 192 in any appropriate manner (e.g., pivotally, for instance by a pivot pin 202 (e.g., FIGS. 9A, 9B, and 10A). The latch 200 is movable between an open position (e.g., FIG. 9B) and a closed position (e.g., FIG. 9A). A latching collar 204 (e.g., FIGS. 9B-9E) extends from the latch 200 and includes a pin receptacle 206 that is disposed about a portion of the recess 184 of the connector pin 182 for the corresponding linkage end connector 180. This should restrain or preclude relative vertical movement between the linkage end connector 180 and the cane connector 190 when the latch 200 is in its closed position. A fastener 208 may also be threadably engaged with a lower end of the connector pin 182 to further restrain or preclude relative movement between the linkage end connector 180 and the cane connector 190 when the connector pin 182 is positioned in the pin housing 196, and even when the latch 200 is in an open position. A washer may be disposed between the head of the fastener 208 and the lower surface of the pin housing 196 through which the fastener 208 extends to engage the connector pin 182 of the corresponding linkage end connector 180.

The back support adjustment assembly 130 is adjustable in variety of respects, including as illustrated in FIGS. 10A-10E. Referring initially to FIG. 10A, each of the cane connectors 109 is adjustable in the vertical dimension or along the length dimension of the corresponding wheelchair canes 100, and as illustrated by arrows A. The swivel assembly 210 is adjustable in a dimension in which the adjustments slots 222 through the mounting plate 220 collectively extend along their long axis, which is parallel to arrow B when the swivel assembly 210 is in the orientation illustrated in FIG. 10A. The swivel housings 230 are collectively rotatable in either direction and relative to the swivel sections 234 (which are mounted on the central leg 142 and which may be maintained in a fixed position during this adjustment of the swivel housings 230): 1) about an X axis and as represented by arrow C; 2) about a Y axis and as represented by arrow D; and 3) about a Z axis and as represented by arrow E. The swivel housings 230 are also collectively rotatable in any direction and relative to the swivel sections 234 at any angle in/relative to one or more of the X, Y, and Z dimensions (and as represented by the additional arrows that are positioned over the swivel housings 230 in FIG. 10A). FIGS. 10B and 10C show representative positions that the swivel housings 230 may be collectively rotatable into and relative to the swivel sections 234.

Figure 10D:
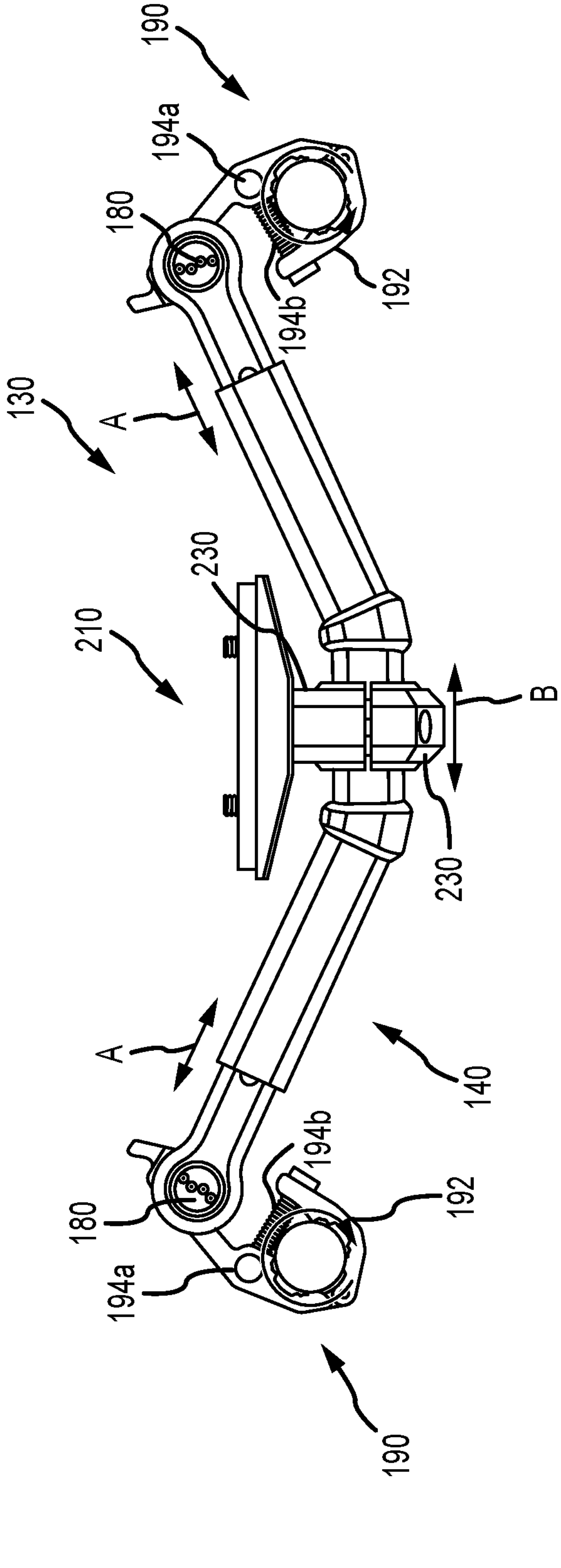
FIG. 10D is a top view of the back support adjustment assembly shown in FIG. 10A, and in a maximum forward position relative to the wheelchair canes.

A maximum forward position of the back support adjustment assembly 130 is illustrated in FIG. 10D. This disposes the linkage end connectors 180 of the linkage 140 forward of their corresponding wheelchair cane 100. The clamping screws 194*b* may be loosened to allow the cane connectors 190 to rotate about their corresponding wheelchair cane 100 and into the position shown in FIG. 11B, after which the clamping screws 194*b* may be tightened to maintain each cane connector 190 in a fixed position relative to its corresponding wheelchair cane 100.

Additional adjustments of the back support adjustment assembly 130 are illustrated in FIG. 10D. Each end leg 170 may be adjusted relative to its corresponding intermediate leg 160 and as indicated by arrows A (to change the spacing between the corresponding end connector 180 and the swivel assembly 210). The position of the entire swivel assembly 210 may be adjusted relative to the central leg 142 as indicated by arrow B, which changes the position of the swivel assembly 210 (and thereby the back support 110) in the lateral dimension.

Figure 10E:
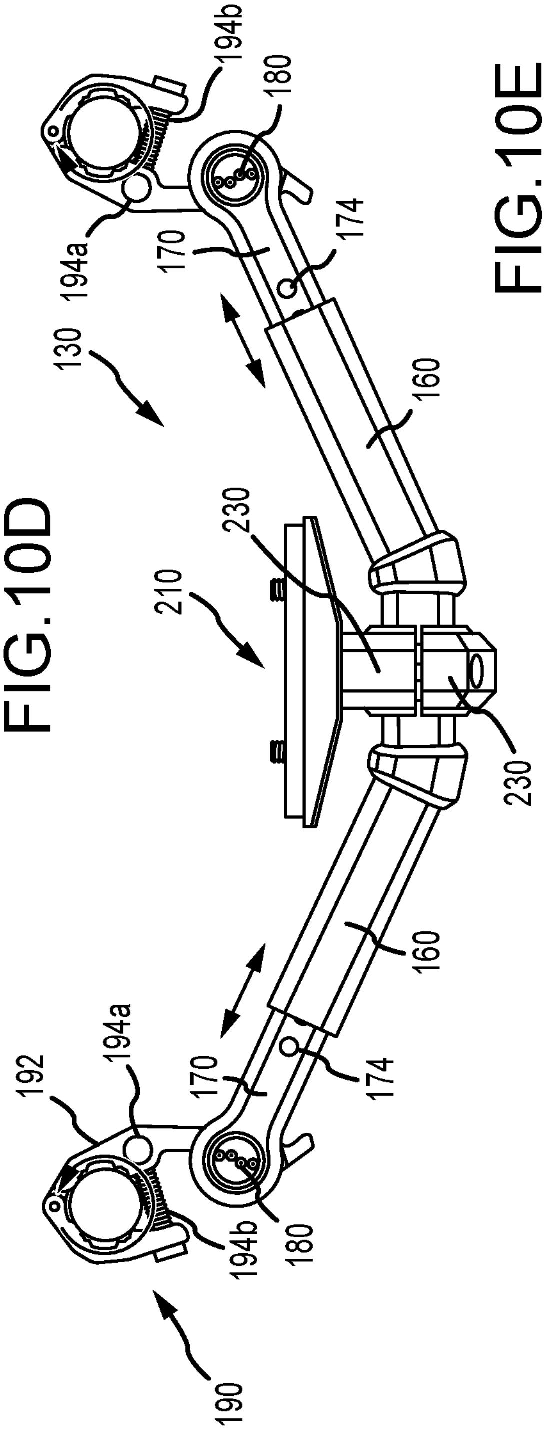
FIG. 10E is a top view of the back support adjustment assembly shown in FIG. 10A, and in a maximum rearward position relative to the wheelchair canes.

A maximum rearward position of the wheelchair back support adjustment assembly 130 is illustrated in FIG. 10E. This disposes the linkage end connectors 180 of the linkage 140 rearward of their corresponding wheelchair cane 100. The clamping screws 194*b* may be loosened to allow the cane connectors 190 to rotate about their corresponding wheelchair cane 100 and into the position shown in FIG. 10E, after which the clamping screws 194*b* may be tightened to maintain each cane connector 190 in a fixed position relative to its corresponding wheelchair cane 100. The same adjustments discussed above with regard to FIG. 10D can also be made in the configuration of FIG. 10E.

Figure 11A:
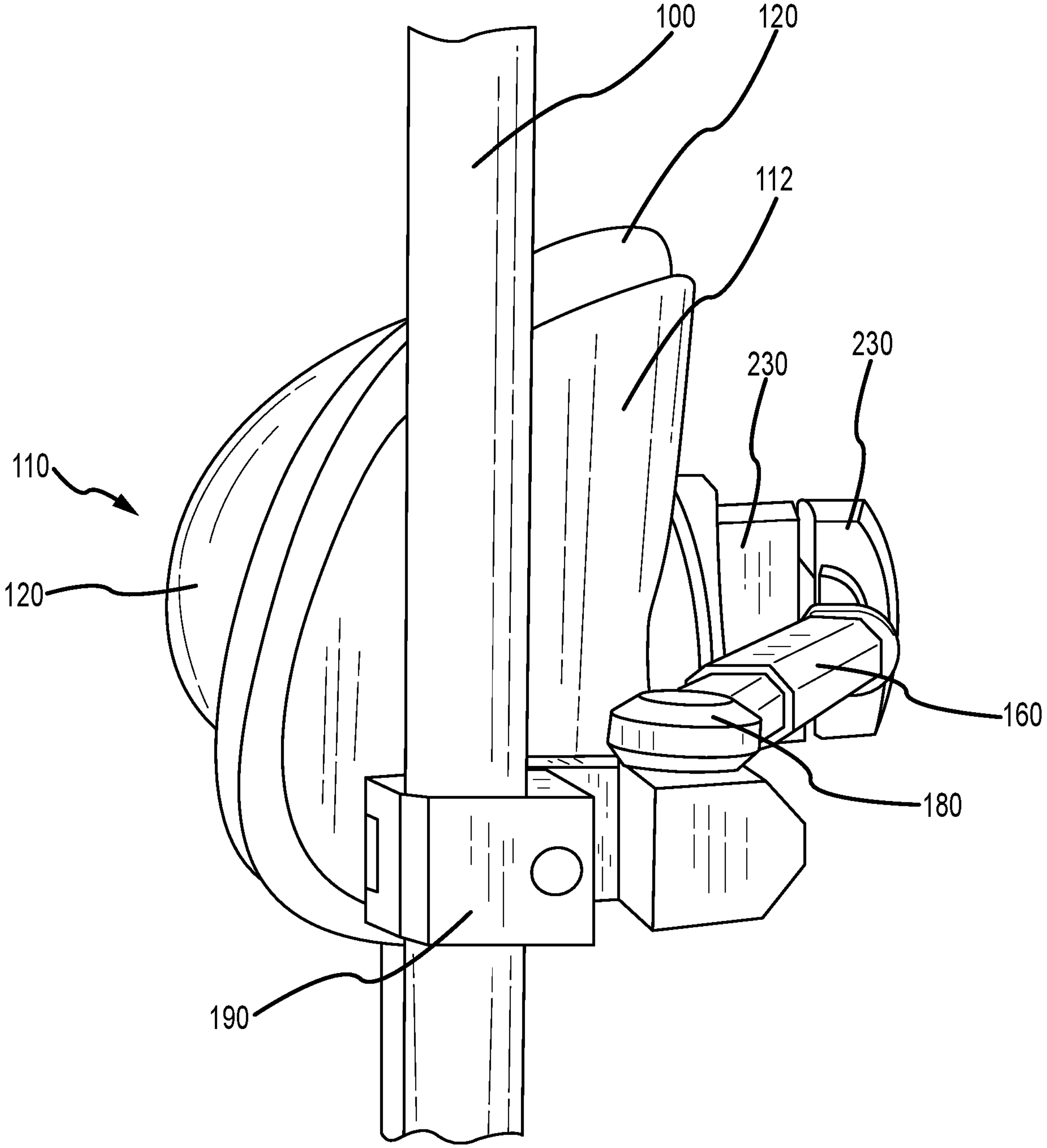
FIG. 11A is a side, perspective view of the back support adjustment assembly shown in FIGS. 4A-4C, with both linkage end connectors being in a rearward position relative to the wheelchair canes.
Figure 11B:
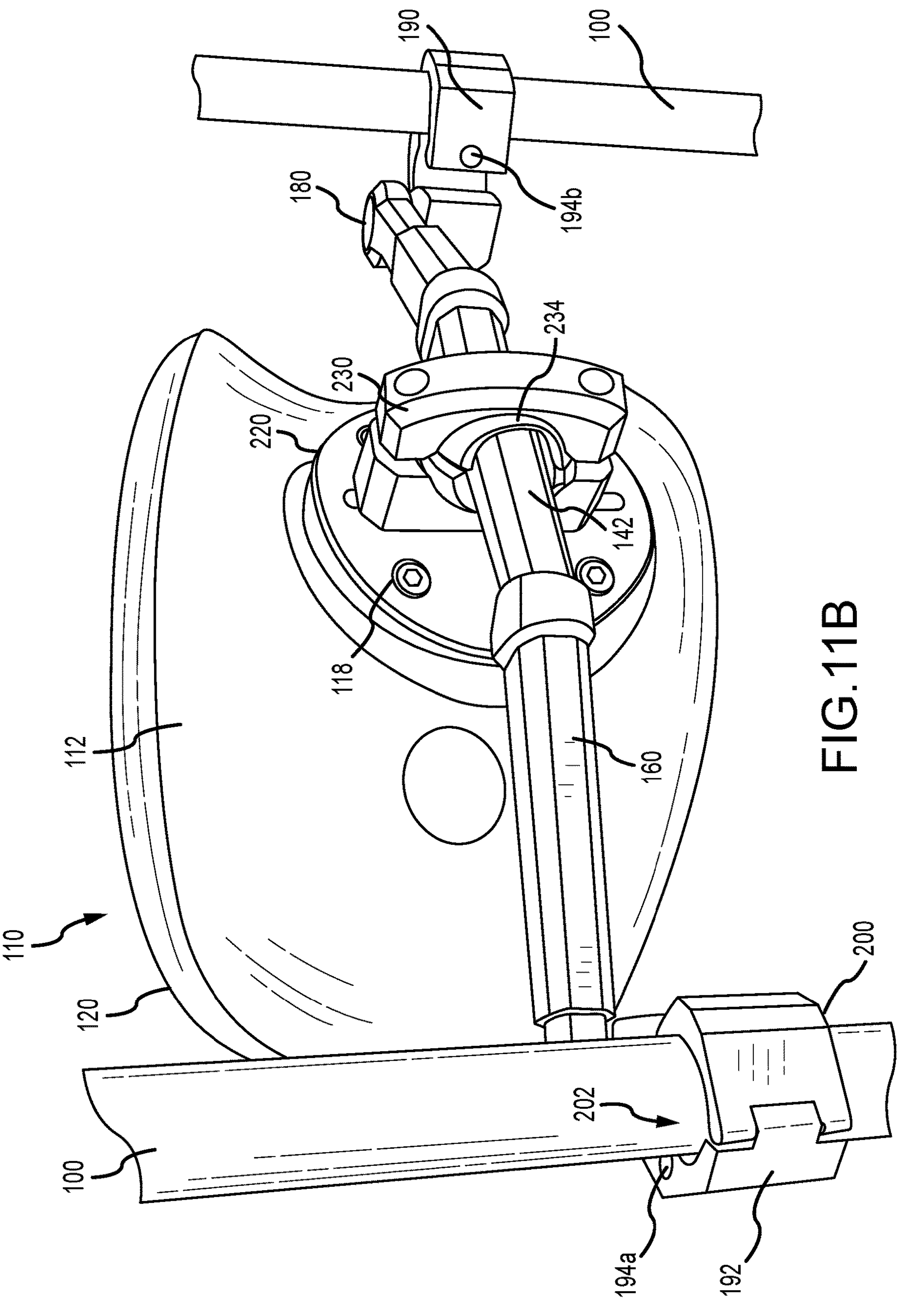
FIG. 11B is a rear, perspective view of the back support adjustment assembly shown in FIGS. 4A-4C, with both linkage end connectors being in a forward position relative to the wheelchair canes.
Figure 11C:
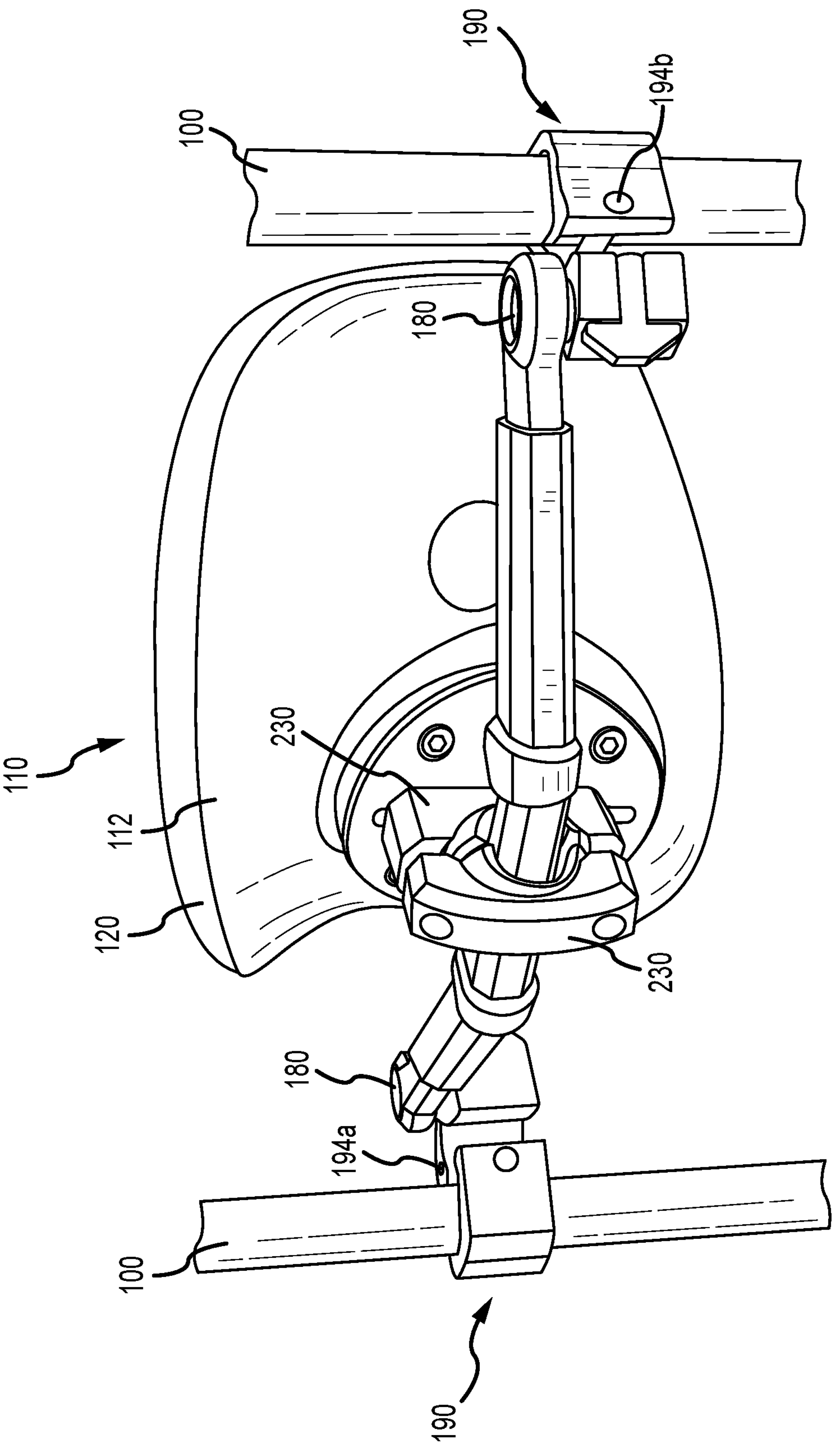
FIG. 11C is a rear, perspective view of the back support adjustment assembly shown in FIGS. 4A-4C, with one linkage end connector being in a forward position relative to its corresponding wheelchair cane and with the other linkage end connector being in a rearward position relative to its corresponding the wheelchair cane.
Figure 11D:
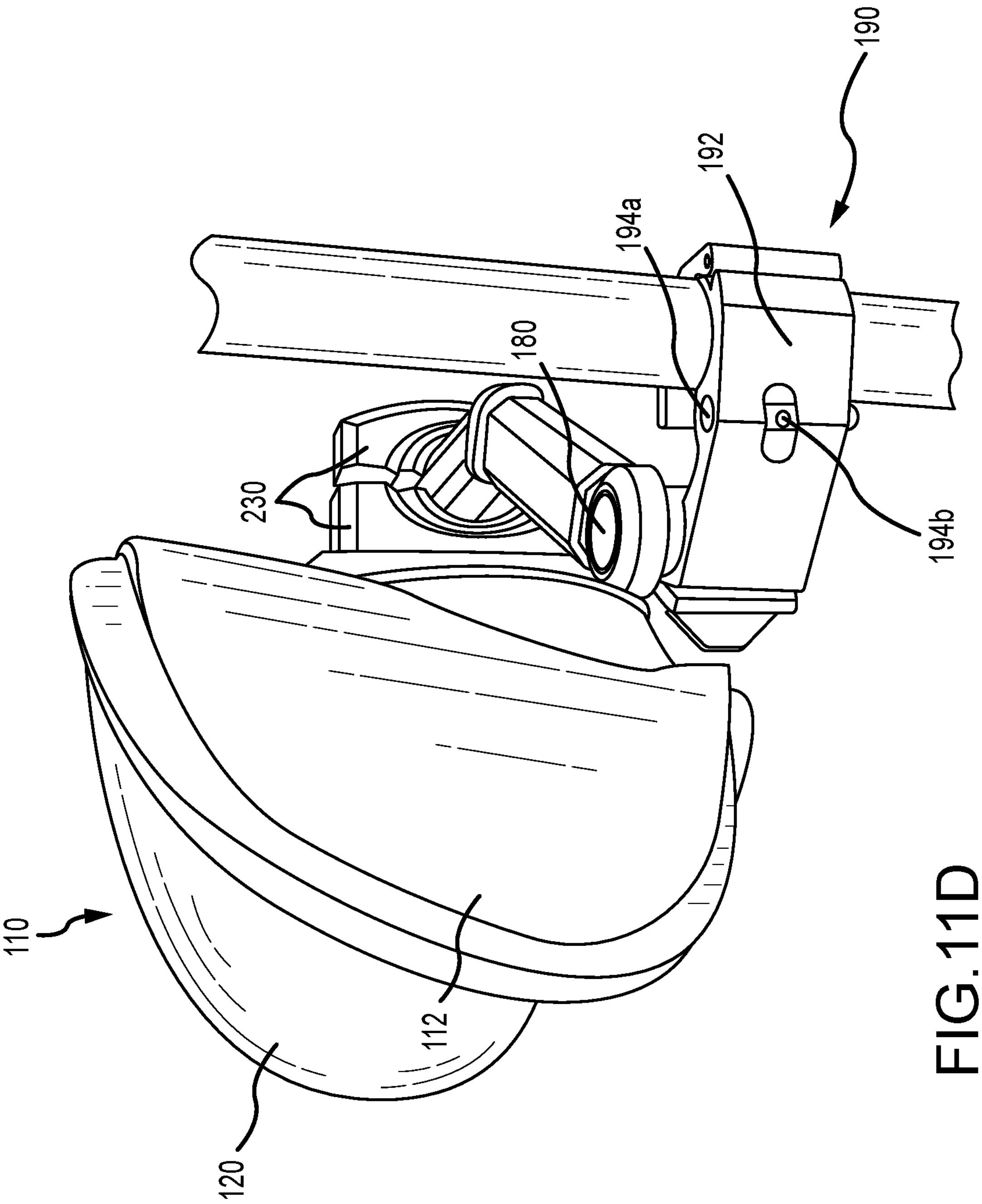
FIG. 11D is a side, perspective view of the back support adjustment assembly in the FIG. 11C configuration.

Representative configurations of the back support adjustment assembly 130 are presented in FIGS. 11A-11D, and each of which may be realized by rotating the end connectors 180 about their corresponding wheelchair cane 100 (e.g., after loosening the clamping screws 194*b* of the cane connectors 190). FIG. 11A shows both end connectors 180 of the linkage 140 being positioned rearward of their corresponding wheelchair cane 100. FIG. 11B shows both end connectors 180 of the linkage 140 being positioned forward of their corresponding wheelchair cane 100. FIGS. 11C and 11D each illustrate one end connector 180 of the linkage 140 being positioned forward of their corresponding wheelchair cane 100, with the other end connector 180 of the linkage 140 being positioned rearward of their corresponding wheelchair cane 100.

Figure 12:
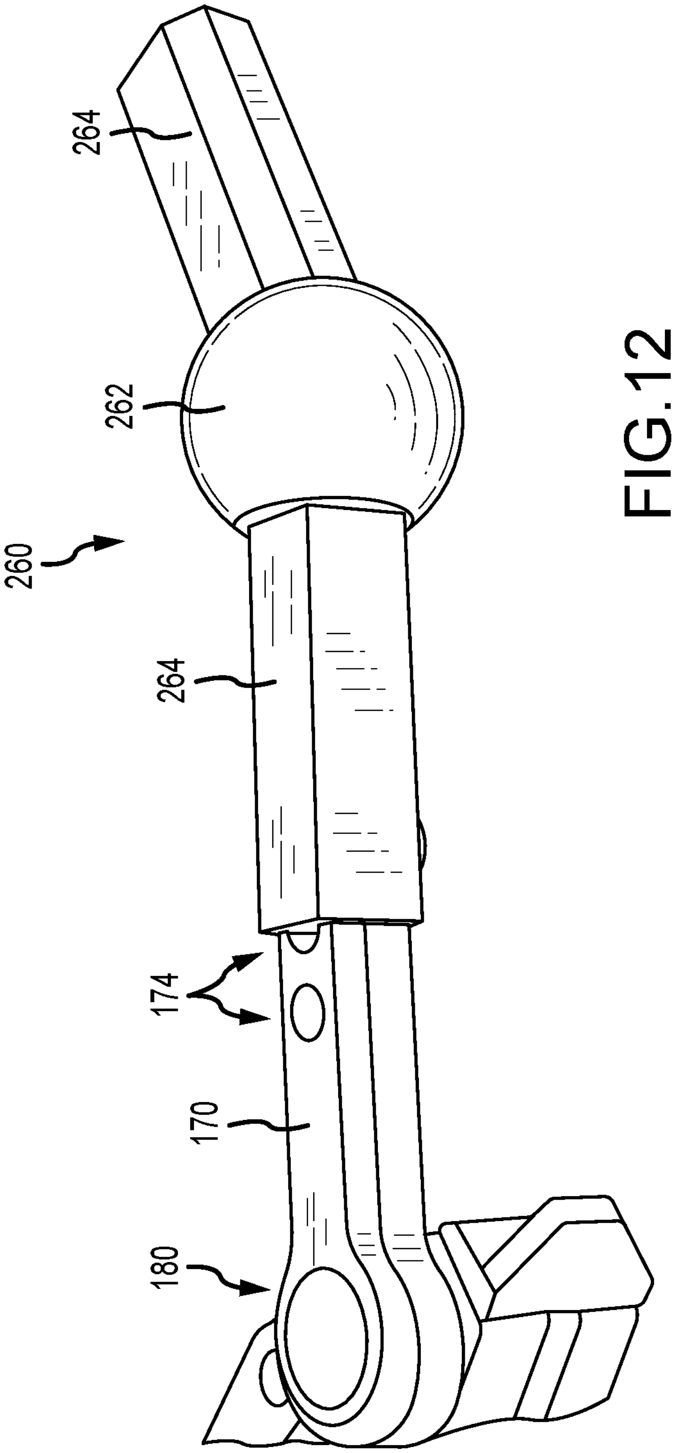
FIG. 12 is a perspective view of an alternative central leg for the back support adjustment assembly shown in FIGS. 4A-4C.

FIG. 12 illustrates an alternative configuration of a central leg 260 that may be used in place of the central leg 142 of the linkage 140 for the back support adjustment assembly 130 addressed herein. Generally, the central leg 260 is configured for use with smaller-sized wheelchair users (e.g., children). The central leg 260 includes swivel 262 (e.g., spherically-shaped) on which the above-discussed swivel housings 230 (possibly adapted in sized) of the swivel assembly 210 may be mounted. A leg 264 extends from and is fixed to each side of the swivel 262. An included angle is defined between the two legs 264, and this included angle may be in a range of between 90° and 180° (e.g., about 155° in one embodiment; within a range of about 120° to about 170° in one embodiment). Each leg 264 (e.g., a lower surface thereof) may include a hole (e.g., extending through at least one wall of the leg 264) or a slot that extends along the length dimension of the leg 264 at least generally in the manner of the intermediate leg 160 discussed above.

Each leg 264 of the central leg 260 is telescopingly engaged with one of the above-noted end legs 170. As such, the position of each leg 264 relative to its corresponding end leg 170 may be adjusted along the length dimension of the corresponding end leg 170, and thereafter the legs 262, 170 may be disposed in a fixed position relative to one another in the manner discussed above regarding each intermediate leg 160 and it corresponding end leg 170 (e.g., directing a fastener through a portion of the leg 264 and into threaded engagement with an aligned hole 174 of the corresponding end leg 170).

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

Any feature addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally" or the like in relation to a particular feature encompasses the corresponding characteristic and insubstantial variations thereof (e.g., indicating that a surface is at least substantially or generally flat encompasses the surface actually being flat and insubstantial variations thereof). Finally, a reference of a feature in conjunction with the phrase "in one embodiment" does not limit the use of the feature to a single embodiment.

What is claimed is:

1. A wheelchair back support adjustment assembly, comprising:

a swivel assembly, wherein said swivel assembly is the only portion of said wheelchair back support adjustment assembly that engages a back support of a wheelchair when said wheelchair back support adjustment assembly is in an installed configuration.

2. The wheelchair back support adjustment assembly of claim 1, wherein said swivel assembly comprises a swivel housing disposed about a swivel.

3. The wheelchair back support adjustment assembly of claim 2, further comprising:

a central leg, wherein an outer perimeter of said central leg defines a polygon, wherein said swivel comprises first and second swivel sections that collectively define said swivel, wherein each of said first and second swivel sections comprise mating surfaces disposed in interfacing relation with a corresponding portion of said outer perimeter of said central leg, wherein said swivel assembly is configurable such that said swivel is unable to rotate about a length dimension of said central leg.

4. The wheelchair back support adjustment assembly of claim 2, wherein said swivel is maintained in a fixed position relative to said swivel housing when said wheelchair back support adjustment assembly is in the installed configuration.

5. The wheelchair back support adjustment assembly of claim 4, wherein said swivel assembly comprises first and second fasteners disposable between first and second configurations, wherein said first configuration for said first and second fasteners maintains said swivel assembly in a fixed position relative to the back support when said wheelchair back support adjustment assembly is in the installed configuration, and wherein said second configuration for said first and second fasteners allows said swivel housing to move in at least three dimensions relative to said swivel.

6. The wheelchair back support adjustment assembly of claim 5, further comprising a central leg, wherein said swivel assembly is mounted on said central leg, wherein said first configuration for said first and second fasteners maintains said swivel assembly in a fixed position relative to said central leg, and wherein said second configuration for said first and second fasteners allows an entirety of said swivel assembly to move axially along said central leg.

7. The wheelchair back support adjustment assembly of claim 6, wherein said swivel interfaces with said central leg.

8. The wheelchair back support adjustment assembly of claim 7, wherein said central leg and said swivel are configured such that said swivel is unable to rotate about said central leg.

9. The wheelchair back support adjustment assembly of claim 5, further comprising:

a mounting plate comprising at least one slot, wherein said first and second fasteners extend through said at least one slot.

10. The wheelchair back support adjustment assembly of claim 9, wherein said first configuration for said first and second fasteners maintains said swivel assembly in a fixed position relative to mounting plate, and wherein said second configuration for said first and second fasteners allows an entirety of said swivel assembly to move axially along said at least one slot of said mounting plate.

11. The wheelchair back support adjustment assembly of claim 4, wherein said swivel housing comprises first and second swivel housings that are detachably connectable and that collectively define said swivel housing.

12. The wheelchair back support adjustment assembly of claim 11, wherein each of said first swivel housing and said second swivel housing comprise a concave surface that interfaces with a corresponding portion of said swivel.

13. The wheelchair back support adjustment assembly claim 12, wherein said concave surface of each of said first swivel housing and said second swivel housing is curved in at least two dimensions.

14. The wheelchair back support adjustment assembly of claim 4, wherein an outer perimeter of said swivel, that interfaces with said swivel housing, is curved in at least three dimensions.

15. The wheelchair back support adjustment assembly of claim 4, wherein said swivel comprises first and second swivel sections that collectively define said swivel.

16. The wheelchair back support adjustment assembly of claim 4, further comprising:

a linkage comprising a first end connector and an oppositely disposed second end connector, wherein said first end connector and said second end connector are disposed on first and second sides, respectively, of said linkage, wherein said first and second sides are opposite one another, wherein said first end connector and said second end connector are detachably connectable with a corresponding cane of a wheelchair in the installed configuration, wherein said swivel assembly is detachably mounted to said linkage.

17. The wheelchair back support adjustment assembly of claim 16, wherein said linkage further comprises:

a central leg;

a first leg on said first side of said linkage;

a first end leg on said first side of said linkage, wherein said first leg is disposed between said central leg and said first end leg;

a second leg on said second side of said linkage; and a second end leg on said second side of said linkage, wherein said second leg is disposed between said central leg and said second end leg.

18. The wheelchair back support adjustment assembly of claim 17, wherein said central leg extends along a central axis, wherein said first leg and said first end leg collectively extend along a first axis that is disposed in a different orientation than said central axis, and wherein said second leg and said second end leg collectively extend along a second axis that is disposed in a different orientation than said central axis.

19. The wheelchair back support assembly of claim 18, wherein said first leg and said first end leg are telescopingly interconnected, and wherein said second leg and said second end leg are telescopingly interconnected.

20. The wheelchair back support assembly of claim 19, wherein a collective length of said first leg and said first end leg is adjustable along said first axis, and wherein a collective length of said second leg and said second end leg is adjustable along said second axis.

21. The wheelchair back support assembly of claim 20, wherein said first leg and said end first leg are detachably connectable in a fixed position for each said collective length of said first leg and said first end leg, and wherein said second leg and said second end leg are detachably connectable in a fixed position for each said collective length of said second leg and said second end leg.

22. The wheelchair back support assembly of claim 18, further comprising:

a first connector between said central leg and said first leg, wherein said first connector is separately and detachably connected to said central leg and said first leg; and a second connector between said central leg and said second leg, wherein said second connector is separately and detachably connected to said central leg and said second leg.

23. The wheelchair back support assembly of claim 22, wherein said first connector and said second connector each comprise a boss, wherein a first end of said central leg abuts one side of said boss of said first connector and one end of said first leg abuts an opposite side of said boss of said first connector, and wherein a second end of said central leg abuts one side of said boss of said second connector and one end of said second leg abuts an opposite side of said boss of said second connector.

24. The wheelchair back support assembly of claim 18, wherein when said central leg is disposed within a lateral dimension of a wheelchair in the installed configuration and with a z dimension reference axis being disposed orthogonal to said lateral dimension, said first leg and said first end leg collectively extend in diverging relation to said z dimension reference axis proceeding away from said central leg, and said second leg and said second end leg collectively extend in diverging relation to said z dimension reference axis proceeding away from said central leg.

25. The wheelchair back support adjustment assembly of claim 16, wherein said linkage comprises:

a central leg assembly comprising said swivel, a first leg on said first side of said linkage and that extends from one side of said swivel, and a second leg on said second side of said linkage and that extends from an opposite side of said swivel;

a first end leg on said first side of said linkage and movably interconnected with said first leg;

a second end leg on said second side of said linkage and movably interconnected with said first leg;

wherein said swivel is maintained in a fixed position relative to each of said first leg and said second leg.

26. The wheelchair back support adjustment assembly of claim 25, wherein said first leg and said first end leg collectively extend along a first axis, and wherein said second leg and said second end leg collectively extend along a second axis that is disposed in a different orientation than said first axis.

27. The wheelchair back support assembly of claim 26, wherein said first leg and said first end leg are telescopingly interconnected, and wherein said second leg and said second end leg are telescopingly interconnected.

28. The wheelchair back support assembly of claim 27, wherein a collective length of said first leg and said first end leg is adjustable along said first axis, and wherein a collective length of said second leg and said second end leg is adjustable along said second axis.

29. The wheelchair back support assembly of claim 28, wherein said first leg and said first end leg are detachably connectable in a fixed position for each said collective length of said first leg and said first end leg, and wherein said second leg and said second end leg are detachably connectable in a fixed position for each said collective length of said second leg and said second end leg.

30. The wheelchair back support assembly of claim 26, wherein when a z dimension reference axis bisects said linkage and extends through said swivel, said first leg and said first end leg collectively extend in diverging relation to said z dimension reference axis proceeding away from said swivel and said second leg and said second end leg collectively extend in diverging relation to said z dimension reference axis proceeding away from said swivel portion.

* * * * *